(12) United States Patent
Ying et al.

(10) Patent No.: US 11,463,919 B2
(45) Date of Patent: Oct. 4, 2022

(54) COMMUNICATIONS METHOD AND APPARATUS

(71) Applicant: HUAWEI TECHNOLOGIES CO., LTD., Guangdong (CN)

(72) Inventors: Jiangwei Ying, Beijing (CN); Yanmei Yang, Beijing (CN); Meng Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 17 days.

(21) Appl. No.: 17/064,856

(22) Filed: Oct. 7, 2020

(65) Prior Publication Data

US 2021/0029590 A1 Jan. 28, 2021

Related U.S. Application Data

(63) Continuation of application No. PCT/CN2019/081975, filed on Apr. 9, 2019.

(30) Foreign Application Priority Data

Apr. 9, 2018 (CN) .......................... 201810313223.1

(51) Int. Cl.
*H04W 28/24* (2009.01)
*H04W 4/40* (2018.01)
(Continued)

(52) U.S. Cl.
CPC .......... *H04W 28/24* (2013.01); *H04M 15/66* (2013.01); *H04W 4/40* (2018.02); *H04W 8/08* (2013.01); *H04W 92/18* (2013.01)

(58) Field of Classification Search
CPC ......... H04W 28/24; H04W 4/40; H04W 8/08; H04W 92/18; H04W 72/1236;
(Continued)

(56) References Cited

U.S. PATENT DOCUMENTS

2015/0117293 A1 4/2015 Cho et al.
2016/0381491 A1* 12/2016 Watfa .................... H04W 4/023
455/41.2
(Continued)

FOREIGN PATENT DOCUMENTS

CN 103428731 A 12/2013
CN 103974290 A 8/2014
(Continued)

OTHER PUBLICATIONS

EPO Communication pursuant to Article 94(3) EPC issued in European Application No. 19785078.7 dated Aug. 31, 2021, 6 pages.
(Continued)

*Primary Examiner* — Tejis Daya
*Assistant Examiner* — Abdullahi Ahmed
(74) *Attorney, Agent, or Firm* — Fish & Richardson P.C.

(57) ABSTRACT

This application discloses example communications methods and apparatuses. One example method includes receiving, by a core network element, a first request message from a terminal, where the first request message is used to request information used for PC5 interface-based communication of the terminal. The core network element can then send, to the terminal and based on the first request message, a quality of service (QoS) rule used for the PC5 interface-based communication.

20 Claims, 16 Drawing Sheets

(51) Int. Cl.
*H04M 15/00* (2006.01)
*H04W 8/08* (2009.01)
*H04W 92/18* (2009.01)

(58) Field of Classification Search
CPC ......... H04W 76/23; H04W 4/70; H04W 4/24; H04M 15/66
See application file for complete search history.

(56) References Cited

U.S. PATENT DOCUMENTS

| | | | | |
|---|---|---|---|---|
| 2017/0288886 | A1* | 10/2017 | Atari | H04L 65/1006 |
| 2017/0289098 | A1 | 10/2017 | Chun et al. | |
| 2017/0303322 | A1* | 10/2017 | Watfa | H04W 28/24 |
| 2018/0234524 | A1* | 8/2018 | Cheng | H04W 72/1263 |
| 2018/0270888 | A1* | 9/2018 | Faccin | H04W 76/15 |
| 2019/0124015 | A1* | 4/2019 | Loehr | H04W 72/02 |
| 2019/0182639 | A1* | 6/2019 | Basu Mallick | H04W 72/10 |
| 2019/0317812 | A1* | 10/2019 | Gebara | H04L 67/10 |
| 2020/0178048 | A1* | 6/2020 | Kim | H04W 4/40 |
| 2020/0337062 | A1 | 10/2020 | Deng | |
| 2021/0084542 | A1* | 3/2021 | Ahmad | H04W 28/24 |

FOREIGN PATENT DOCUMENTS

| | | |
|---|---|---|
| CN | 104272707 A | 1/2015 |
| CN | 104823511 A | 8/2015 |
| CN | 106160951 A | 11/2016 |
| CN | 106162512 A | 11/2016 |
| CN | 106797668 A | 5/2017 |
| CN | 107027104 A | 8/2017 |
| CN | 107347214 A | 11/2017 |
| CN | 107734545 A | 2/2018 |
| WO | 2017206168 A1 | 12/2017 |
| WO | 2018016157 A1 | 1/2018 |
| WO | 2018028694 A1 | 2/2018 |

OTHER PUBLICATIONS

3GPP TS 22.185 V14.3.0 (Mar. 2017), "3rd Generation Partnership Project;Technical Specification Group Services and System Aspects ;Service requirements for V2X services;Stage 1 (Release 14)," Mar. 2017, 14 pages.

3GPP TS 22.186 V15.2.0 (Sep. 2017), "3rd Generation Partnership Project;Technical Specification Group Services and System Aspects;Enhancement of 3GPP support for V2X scenarios;Stage 1 (Release 15)," Sep. 2017, 16 pages.

Office Action issued in Chinese Application No. 201810313223.1 dated Apr. 1, 2020, 15 pages (with English translation).

PCT International Search Report and Written Opinion issued in International Application No. PCT/CN2019/081975 dated Jul. 24, 2019, 15 pages (with English translation).

3GPP TR 23.785 V0.3.0 (Apr. 2016), "3rd Generation Partnership Project; Technical Specification Group Services and System Aspects; Study on architecture enhancements for LTE support of V2X services(Release 14)," Apr. 2016, 37 pages.

Extended European Search Report issued in European Application No. 19785078.7 dated Nov. 26, 2020, 9 pages.

3GPP TR 23.786 V0.4.0 (Mar. 2018), "3rd Generation Partnership Project; Technical Specification Group Services and System Aspects; Study on architecture enhancements for EPS and 5G System to support advanced V2X services (Release 16)," Mar. 2018, 23 pages.

Huawei, HiSilicon, "Procedures for the provision of Network-controlled QoS for PC5 communication," 3GPP TSG SA NG2 #128, S2-186839, Vilnius, Lithuania, Jul. 2-6, 2018, 13 pages.

Huawei, HiSilicon, "Solution to Key Issue #4: Network-controlled QoS mechanism for side link communication," 3GPP TSG SA WG2 #127, S2-183740, Nanjing, China, May 23-27, 2016, 10 pages.

Huawei, HiSilicon, "Update and conclusion of Solution 6," 3GPP TSG-SA WG2#115, S2-162540, Nanjing, China, May 23-27, 2016, 7 pages.

Office Action issued in Japanese Application No. 2020-555477 dated Dec. 6, 2021, 9 pages (with English translation).

Shiyu, "Research on Resource Management of LTE-based V2X Communication," Beijing University of Posts and Telecommunications, Mar. 2018, 2 pages (with English abstract).

Office Action issued in Chinese Application No. 202110415772.1 dated Jan. 7, 2022, 6 pages.

* cited by examiner

COMMUNICATIONS METHOD AND APPARATUS

CROSS-REFERENCE TO RELATED APPLICATIONS

This application is a continuation of International Application No. PCT/CN2019/081975, filed on Apr. 9, 2019, which claims priority to Chinese Patent Application No. 201810313223.1, filed on Apr. 9, 2018. The disclosures of the aforementioned applications are hereby incorporated by reference in their entireties.

TECHNICAL FIELD

This application relates to the field of communications technologies, and in particular, to a communications method and apparatus.

BACKGROUND

Continuous development of mobile communications technologies brings lots of innovative applications to various industries. For example, mobile broadband, multimedia, machine type communication (MTC for short), industrial control, and an intelligent transportation system (ITS for short) will become main use cases in the 5G era. Many applications relate to a vehicle-to-everything (V2X for short) service, to be specific, a vehicle may communicate with another device for transmission of a V2X message, where the communication includes communication between vehicles, communication between a vehicle and a pedestrian, communication between a vehicle and a roadside unit, and the like. The V2X message is sent over a PC5 interface between terminals. Currently, an application layer sets a ProSe per packet priority (PPPP for short) for each type of V2X message and transfers the PPPP to a communications network layer (a non-access stratum (NAS for short) or an access stratum (AS for short)). To be specific, a mapping relationship between a V2X message and a PPPP is configured on a terminal side, and the terminal and a base station perform negotiation, so that the base station generates a mapping relationship between a PPPP and a PC5 interface resource for the terminal. When obtaining a PC5 interface resource corresponding to a V2X message to transmit the V2X message, the terminal sends, to the base station, a PPPP corresponding to the V2X message. Then, the base station determines the PC5 interface resource for the V2X message based on the mapping relationship between a PPPP and a PC5 interface resource, and sends the PC5 interface resource to the terminal, so that the terminal sends the V2X message based on the PC5 interface resource. Setting of the PPPP reflects a quality of service (QoS for short) requirement of the V2X message.

A vehicle generates various types of V2X messages, for example, a cooperative awareness message (CAM for short), a decentralized environmental notification message (DENM for short), an entertainment application message between vehicles, and navigation information exchanged between vehicles. With development of a V2X technology, new types of V2X messages continuously emerge. For different upper-layer applications, types of V2X messages generated by a vehicle usually correspond to different QoS requirements. A terminal controls a corresponding PC5 interface resource by obtaining a QoS requirement corresponding to a V2X message. However, because an existing mechanism is a mechanism in which the application layer sends QoS information to a lower layer, the application layer may increase a QoS level without authorization. In other words, QoS information that is of a V2X message and that is obtained by the terminal is prone to be modified in an unauthorized manner. Consequently, the obtained QoS in formation is unreliable.

SUMMARY

Embodiments of the present invention provide a communications method and apparatus, to obtain, from a network side, QoS information used for PC5 interface-based communication, thereby improving reliability of the obtained QoS information, and preventing the QoS information from being modified without authorization.

According to a first aspect, a communication method is provided. The communication method includes: receiving, by a core network element, a first request message from a terminal, where the first request message is used to request information used for PC5 interface-based communication of the terminal; and sending, by the core network element to the terminal based on the first request message, a QoS rule (s) used for the PC5 interface-based communication. Optionally, the core network element may be a mobility management network element or a session management function network element. That the first request message is used to request information used for PC5 interface-based communication of the terminal may mean that the first request message may be used to request the information used for the PC5 interface-based communication of the terminal or that the first request message may be used to request information used for V2X communication or other information, where the information used for the V2X communication or the other information includes the information for the PC5 interface-based communication of the terminal. In this way, QoS information used for the PC5 interface-based communication can be obtained from a network side. This helps improve reliability and flexibility of the obtained QoS information, and prevents the QoS information from being modified without authorization.

With reference to the first aspect, in a first possible design of the first aspect, the core network element sends, to a base station based on the first request message, a QoS profile used for the PC5 interface-based communication.

With reference to the first aspect or the first possible design of the first aspect, in a second possible design of the first aspect, the core network element may be the session management function network element. Further, the core network element such as the session management function network element sends a second request message to a parameter configuration network element based on the first request message, where the second request message is used to request the information used for the PC5 interface-based communication, or the second request message may be used to request the information used for the V2X communication or the other information. The information used for the V2X communication or the other information includes the information for the PC5 interface-based communication of the terminal. The core network element receives, from the parameter configuration network element, a policy and charging control (PCC for short) rule (s) used for the PC5 interface-based communication. The core network element obtains the QoS rule and/or the QoS profile according to the PCC rule.

With reference to the first aspect or the first possible design of the first aspect, in a third possible design of the first aspect, the core network element may be the mobility management network element. Further, the core network element such as the mobility management network element sends a second request message to a parameter configuration network element based on the first request message, where the second request message is used to request the information used for the PC5 interface-based communication, or the second request message may be used to request the information used for the V2X communication or the other information. The information used for the V2X communication or the other information includes the information for the PC5 interface-based communication of the terminal. The core network element receives, from the parameter configuration network element, the QoS rule and/or the QoS profile that are/is used for the PC5 interface-based communication. The QoS rule and/or the QoS profile may be determined by the parameter configuration network element according to a PCC rule obtained based on the second request message.

With reference to the first aspect, the first possible design of the first aspect, the second possible design of the first aspect, or the third possible design of the first aspect, in a fourth possible design of the first aspect, the first request message includes first indication information, where the first indication information is used to indicate that the first request message is used to request the information used for the PC5 interface-based communication, or the first indication information may be used to indicate that the first request message is used to request the information used for the V2X communication. The information used for the V2X communication includes the information for the PC5 interface-based communication. In this way, the core network element can quickly determine that the first request message is used to request the information for the PC5 interface-based communication (or the information for the V2X communication).

With reference to the second possible design of the first aspect or the third possible design of the first aspect, in a fifth possible design of the first aspect, the second request message includes second indication information, where the second indication information is used to indicate that the second request message is used to request the information used for the PC5 interface-based communication, or the second indication information may be used to indicate that the second request message is used to request the information used for the V2X communication. The information used for the V2X communication includes the information for the PC5 interface-based communication. In this way, the parameter configuration network element can quickly determine that the second request message is used to request the information for the PC5 interface-based communication (or the information for the V2X communication).

With reference to the first possible design of the first aspect, in a sixth possible design of the first aspect, the core network element sends third indication information to the base station, where the third indication information is used to indicate that the QoS profile is used for the PC5 interface-based communication. In this way, the base station can quickly determine that the QoS profile is used for the PC5 interface-based communication.

With reference to the second possible design of the first aspect, in a seventh possible design of the first aspect, the core network element receives fourth indication information from the parameter configuration network element, where the fourth indication information is used to indicate that the PCC rule is used for the PC5 interface-based communication. In this way, the core network element can quickly determine that the PCC rule is used for the PC5 interface-based communication.

With reference to the third possible design of the first aspect, in an eighth possible design of the first aspect, the core network element receives fifth indication information from the parameter configuration network element, where the fifth indication information is used to indicate that the QoS rule and/or the QoS profile are/is used for the PC5 interface-based communication. In this way, the core network element can quickly determine that the QoS rule and/or the QoS profile are/is used for the PC5 interface-based communication.

With reference to the first aspect, the first possible design of the first aspect, the second possible design of the first aspect, the third possible design of the first aspect, the fourth possible design of the first aspect, the fifth possible design of the first aspect, the sixth possible design of the first aspect, the seventh possible design of the first aspect, or the eighth possible design of the first aspect, in a ninth possible design of the first aspect, the first request message is a protocol data unit (PDU for short) session establishment message or a PDU session modification message. In this case, the core network element skips triggering establishment of an N3 tunnel and an N4 tunnel for a PDU session. In this way, system overheads can be reduced.

With reference to the fourth possible design of the first aspect, in a tenth possible design of the first aspect, when the first request message carries the first indication information, the core network element skips triggering establishment of an N3 tunnel and an N4 tunnel. In this way, system overheads can be reduced.

With reference to the ninth possible design of the first aspect, in an eleventh possible design of the first aspect, when there is no data transmission on the PDU session, the core network element skips initiating a network release (AN release) procedure. In this way, reliability of the PC5 interface-based communication can be improved.

With reference to the ninth possible design of the first aspect, in a twelfth possible design of the first aspect, when there is no data transmission on the PDU session, the core network element skips initiating a PDU session deactivation (selective deactivation of UP connection of an existing PDU session) procedure. In this way, reliability of the PC5 interface-based communication can be improved.

With reference to the first aspect, the first possible design of the first aspect, the second possible design of the first aspect, the third possible design of the first aspect, the fourth possible design of the first aspect, the fifth possible design of the first aspect, the sixth possible design of the first aspect, the seventh possible design of the first aspect, the eighth possible design of the first aspect, the ninth possible design of the first aspect, the tenth possible design of the first aspect, the eleventh possible design of the first aspect, or the twelfth possible design of the first aspect, in a thirteenth possible design of the first aspect, the core network element may alternatively receive the PCC rule from the parameter configuration network element; the core network element obtains the QoS rule and/or the QoS profile according to the PCC rule; and the core network element sends the QoS rule to the terminal, and/or sends the QoS profile to the base station. Alternatively, the core network element receives the QoS rule and/or the QoS profile from the parameter configuration network element; and the core network element sends the QoS rule to the terminal, and/or sends the QoS profile to the base station. Optionally, the core network element receives sixth indication information from the parameter configuration network element, where the sixth indication information is used to indicate that the PCC rule is used for the PC5 interface-based communication, or the sixth indication information is used to indicate that the QoS rule and/or the QoS profile are/is used for the PC5 interface-based communication.

According to a second aspect, a communication method is provided. The communication method includes: receiving, by a parameter configuration network element, a first request message from a core network element, where the first request message is used to request information used for PC5 interface-based communication of a terminal; and sending, by the parameter configuration network element to the core network element based on the first request message, a policy and charging control PCC rule used for the PC5 interface-based communication; or sending, by the parameter configuration network element to the core network element based on the first request message, a quality of service QoS rule and/or a QoS profile that are/is used for the PC5 interface-based communication. That the first request message is used to request information used for PC5 interface-based communication of a terminal may mean that the first request message may be used to request the information used for the PC5 interface-based communication of the terminal or that the first request message may be used to request information used for V2X communication or other information, where the information used for the V2X communication or the other information includes the information for the PC5 interface-based communication of the terminal. Optionally, the parameter configuration network element may be a policy and charging function PCF network element, and the first request message is an access and mobility policy control create (Npcf_AMPolicyControl_Create) message. Alternatively, the parameter configuration network element may be a vehicle-to-everything V2X parameter configuration network element, and the first request message is a V2X parameter request message. Alternatively, the parameter configuration network element may be a session management function network element, and the first request message is a PDU session create session management context request, such as Nsmf_PDUSession_CreateSMContext Request message, which is provided by a session management function network element (such as SMF). In this way, QoS information used for the PC5 interface-based communication can be obtained from a network side. This helps improve reliability and flexibility of the obtained QoS information, and prevents the QoS information from being modified without authorization.

With reference to the second aspect, in a first possible design of the second aspect, the first request message includes first indication information, where the first indication information is used to indicate that the first request message is used to request the information used for the PC5 interface-based communication, or the first indication information may be used to indicate that the first request message is used to request the information used for the V2X communication. The information used for the V2X communication includes the information for the PC5 interface-based communication. In this way, the parameter configuration network element can quickly determine that the first request message is used to request the information for the PC5 interface-based communication (or the information for the V2X communication).

With reference to the second aspect or the first possible design of the second aspect, in a second possible design of the second aspect, the parameter configuration network element sends a second request message to a PCF network element, where the second request message is used to request, from the PCF network element, the information used for the PC5 interface-based communication, or the second request message may be used to request the information used for the V2X communication or the other information. The information used for the V2X communication or the other information includes the information for the PC5 interface-based communication. The V2X parameter configuration network element receives, from the PCF network element, the PCC rule used for the PC5 interface-based communication. Alternatively, the V2X parameter configuration network element receives, from the PCF network element, the QoS rule and/or the QoS profile that are/is used for the PC5 interface-based communication.

With reference to the second possible design of the second aspect, in a third possible design of the second aspect, the second request message includes second indication information, where the second indication information is used to indicate that the second request message is used to request the information used for the PC5 interface-based communication, or the second indication information may be used to indicate that the second request message is used to request the information used for the V2X communication. The information used for the V2X communication includes the information for the PC5 interface-based communication. In this way, the PCF network element can quickly determine that the second request message is used to request the information for the PC5 interface-based communication (or the information for the V2X communication).

With reference to the second aspect, the first possible design of the second aspect, the second possible design of the second aspect, or the third possible design of the second aspect, in a fourth possible design of the second aspect, the parameter configuration network element sends third indication information to the core network element, where the third indication information is used to indicate that the PCC rule is used for the PC5 interface-based communication, or is used to indicate that the QoS rule and/or the QoS profile are/is used for the PC5 interface-based communication. In this way, the core network element can quickly determine that the PCC rule, or the QoS rule and/or the QoS profile are/is used for the PC5 interface-based communication (or the information for the V2X communication).

With reference to the second aspect, the first possible design of the second aspect, the second possible design of the second aspect, the third possible design of the second aspect, or the fourth possible design of the second aspect, in a fifth possible design of the second aspect, the parameter configuration network element obtains the PCC rule used for the PC5 interface-based communication of the terminal, and the parameter configuration network element sends the PCC rule to the core network element. Alternatively, the parameter configuration network element obtains the QoS rule and/or the QoS profile that are/is used for the PC5 interface-based communication of the terminal; and the parameter configuration network element sends the QoS rule and/or the QoS profile to the core network element. The parameter configuration network element sends fourth indication information to the core network element, where the fourth indication information is used to indicate that the PCC rule is used for the PC5 interface-based communication, or the fourth indication information is used to indicate that the QoS rule and/or the QoS profile are/is used for the PC5 interface-based communication.

According to a third aspect, a communication method is provided. The communication method includes: receiving, by a base station, a request message from a terminal, where the request message is used to request information used for PC5 interface-based communication of the terminal; sending, by the base station, the request message to a core network element; and receiving, by the base station from the core network element, a quality of service QoS rule used for the PC5 interface-based communication, and sending the QoS rule to the terminal. That the request message is used to request information used for PC5 interface-based communication of the terminal may mean that the request message may be used to request the information used for the PC5 interface-based communication of the terminal or that the request message may be used to request information used for V2X communication or other information, where the information used for the V2X communication or the other information includes the information for the PC5 interface-based communication of the terminal. In this way, QoS information used for the PC5 interface-based communication can be obtained from a network side. This helps improve reliability and flexibility of the obtained QoS information, and prevents the QoS information from being modified without authorization.

With reference to the third aspect, in a first possible design of the third aspect, the base station receives, from the core network element, a QoS profile used for the PC5 interface-based communication.

With reference to the third aspect or the first possible design of the third aspect, in a second possible design of the third aspect, the request message includes first indication information, where the first indication information is used to indicate that the request message is used to request the information used for the PC5 interface-based communication, or the first indication information may be used to indicate that the request message is used to request the information used for the V2X communication. The information used for the V2X communication includes the information for the PC5 interface-based communication.

With reference to the first possible design of the third aspect or the second possible design of the third aspect, in a third possible design of the third aspect, the base station receives second indication information from the core network element, where the second indication information is used to indicate that the QoS profile is used for the PC5 interface-based communication. In this way, the core network element quickly determines the QoS profile for the PC5 interface-based communication (or the information for the V2X communication).

With reference to the third aspect, the first possible design of the third aspect, the second possible design of the third aspect, or the third possible design of the third aspect, in a fourth possible design of the third aspect, the request message is a PDU session establishment message or a PDU session modification message, and the base station skips triggering establishment of an air-interface data radio bearer (data radio bearer, DRB for short) and/or an N3 tunnel for a PDU session. For example, the base station skips triggering the establishment of the N3 tunnel and the air-interface DRB for the PDU session. For another example, the base station skips triggering the establishment of the N3 tunnel for the PDU session, but may establish the air-interface DRB, to reuse an existing scheduling mechanism and reduce complexity of air-interface resource scheduling.

With reference to the second possible design of the third aspect, in a fifth possible design of the third aspect, when the request message carries the first indication information, the base station skips triggering establishment of a DRB and/or an N3 tunnel.

With reference to the third aspect, the first possible design of the third aspect, the second possible design of the third aspect, the third possible design of the third aspect, the fourth possible design of the third aspect, or the fifth possible design of the third aspect, in a sixth possible design of the third aspect, the base station receives a scheduling request from the terminal, where the scheduling request includes an identifier of the QoS rule; and the base station sends scheduled-resource information to the terminal based on the identifier of the QoS rule. The scheduled-resource information is information about a resource used for the PC5 interface-based communication.

With reference to the third aspect, the first possible design of the third aspect, the second possible design of the third aspect, the third possible design of the third aspect, the fourth possible design of the third aspect, the fifth possible design of the third aspect, or the sixth possible design of the third aspect, in a seventh possible design of the third aspect, the base station receives the QoS profile and/or the QoS rule from the core network element; and if receiving the QoS rule, the base station sends the QoS rule to the terminal. Optionally, the base station may further receive third indication information from the core network element, where the third indication information is used to indicate that the QoS profile and/or the QoS rule are/is used for the PC5 interface-based communication. Further optionally, the base station may send the third indication information to the terminal, where the third indication information is used to indicate that the QoS rule is used for the PC5 interface-based communication.

According to a fourth aspect, a communication method is provided. The communication method includes: sending, by a terminal, a request message to a core network element, where the request message is used to request information used for PC5 interface-based communication of the terminal; and receiving, by the terminal from the core network element, a quality of service QoS rule used for the PC5 interface-based communication. That the request message is used to request information used for PC5 interface-based communication of the terminal may mean that the request message may be used to request the information used for the PC5 interface-based communication of the terminal or that the request message may be used to request information used for V2X communication or other information, where the information used for the V2X communication or the other information includes the information for the PC5 interface-based communication of the terminal. In this way, QoS information used for the PC5 interface-based communication can be obtained from a network side. This helps improve reliability and flexibility of the obtained QoS information, and prevents the QoS information from being modified without authorization.

With reference to the fourth aspect, in a first possible design of the fourth aspect, the request message includes first indication information, where the first indication information is used to indicate that the request message is used to request the information used for the PC5 interface-based communication, or the first indication information may be used to indicate that the request message is used to request the information used for the V2X communication. The information used for the V2X communication includes the information for the PC5 interface-based communication. In this way, the core network element can quickly determine that the request message is used to request the information for the PC5 interface-based communication (or the information for the V2X communication).

With reference to the fourth aspect or the first possible design of the fourth aspect, in a second possible design of the fourth aspect, the terminal may further receive second indication information from the core network element, where the second indication information is used to indicate that the QoS rule is used for the PC5 interface-based communication.

With reference to the fourth aspect, the first possible design of the fourth aspect, or the second possible design of the fourth aspect, in a third possible design of the fourth aspect, the terminal sends a scheduling request to a base station, where the scheduling request includes an identifier of the QoS rule; and the terminal receives scheduled-resource information from the base station, and sends a V2X message on a resource corresponding to the scheduled-resource information. In this way, the terminal can obtain, from the base station according to the QoS rule, PC5 interface resource information used to perform a V2X service. The scheduled-resource information is information about the resource used for the PC5 interface-based communication.

With reference to the fourth aspect, the first possible design of the fourth aspect, or the second possible design of the fourth aspect, in a fourth possible design of the fourth aspect, the terminal obtains QoS requirement information of a V2X message according to the QoS rule; and the terminal determines scheduled-resource information based on the QoS requirement information, and sends the V2X message on a resource corresponding to the scheduled-resource information. The scheduled-resource information is information about the resource used for the PC5 interface-based communication. In this way, after determining a QoS requirement according to the QoS rule, the terminal can obtain, based on the QoS requirement, PC5 interface resource information used to perform a V2X service.

With reference to the fourth aspect, the first possible design of the fourth aspect, the second possible design of the fourth aspect, the third possible design of the fourth aspect, or the fourth possible design of the fourth aspect, in a fifth possible design of the fourth aspect, the terminal receives the QoS rule from the core network element. Optionally, the terminal may further receive third indication information from the core network element, where the third indication information is used to indicate that the QoS rule is used for the PC5 interface-based communication.

According to a fifth aspect, a communication method is provided. The communication method includes: receiving, by a core network element, a PCC rule from a parameter configuration network element; obtaining, by the core network element, a quality of service QoS rule and/or a QoS profile according to the PCC rule; and sending, by the core network element, the QoS rule to a terminal, and/or sending the QoS profile to a base station, where optionally, the core network element may further receive indication information from the parameter configuration network element, where the indication information is used to indicate that the PCC rule is used for PC5 interface-based communication; or receiving, by a core network element, a QoS rule and/or a QoS profile from a parameter configuration network element; and sending, by the core network element, the QoS rule to a terminal, and/or sending the QoS profile to a base station, where optionally, the core network element receives indication information from the parameter configuration network element, where the indication information is used to indicate that the QoS rule and/or the QoS profile are/is used for PC5 interface-based communication.

Optionally, the core network element may further perform some or all steps of the core network element according to the first aspect. Details are not described herein again.

According to a sixth aspect, a communication method is provided. The communication method includes: obtaining, by a parameter configuration network element, a PCC rule used for PC5 interface-based communication of a terminal; and sending, by the parameter configuration network element, the PCC rule to a core network element, where optionally, the parameter configuration network element sends indication information to the core network element, where the indication information is used to indicate that the PCC rule is used for the PC5 interface-based communication; or obtaining, by a parameter configuration network element, a QoS rule and/or a QoS profile that are/is used for PC5 interface-based communication of a terminal; and sending, by the parameter configuration network element, the QoS rule and/or the QoS profile to a core network element, where optionally, the parameter configuration network element sends indication information to the core network element, where the indication information is used to indicate that the QoS rule and/or the QoS profile are/is used for the PC5 interface-based communication.

Optionally, the parameter configuration network element may further perform some or all steps of the parameter configuration network element according to the second aspect. Details are not described herein again.

According to a seventh aspect, a communication method is provided. The communication method includes: receiving, by a base station, a QoS profile and/or a QoS rule from a core network element; and if receiving the QoS rule, sending, by the base station, the QoS rule to a terminal. Optionally, the base station may further receive indication information from the core network element, where the indication information is used to indicate that the QoS profile and/or the QoS rule are/is used for PC5 interface-based communication. Further optionally, the base station may further send the indication information to the terminal, to indicate that the QoS rule is used for the PC5 interface-based communication.

Optionally, the base station may further perform some or all steps of the base station according to the third aspect. Details are not described herein again.

According to an eighth aspect, a communication method is provided. The communication method includes: receiving, by a terminal, a QoS rule from a core network element. Optionally, the terminal may further receive indication information from the core network element, where the indication information is used to indicate that the QoS rule is used for PC5 interface-based communication.

Optionally, the terminal may further perform some or all steps of the terminal according to the fourth aspect. Details are not described herein again.

According to a ninth aspect, a communications apparatus is provided. The communications apparatus includes units or means configured to perform the steps in the method according to the first aspect and/or the fifth aspect. The communications apparatus may be a core network element such as a mobility management network element or a session management function network element, or may be at least one processing element or chip.

According to a tenth aspect, a communications apparatus is provided. The communications apparatus includes a transceiver, a memory, and a processor. The processor is coupled to the memory and the transceiver. The memory is configured to store a program. The processor invokes the program stored in the memory, to perform the method according to the first aspect and/or the fifth aspect. The transceiver is configured to receive and/or send information. The communications apparatus may be a core network element such as a mobility management network element or a session management function network element, or may be at least one processing element or chip.

According to an eleventh aspect, a communications apparatus is provided. The communications apparatus includes units or means configured to perform the steps in the method according to the second aspect and/or the sixth aspect. The communications apparatus may be a parameter configuration network element, or may be at least one processing element or chip.

According to a twelfth aspect, a communications apparatus is provided. The communications apparatus includes a transceiver, a memory, and a processor. The processor is coupled to the memory and the transceiver. The memory is configured to store a program. The processor invokes the program stored in the memory, to perform the method according to the second aspect and/or the sixth aspect. The transceiver is configured to receive and/or send information. The communications apparatus may be a parameter configuration network element, or may be at least one processing element or chip.

According to a thirteenth aspect, a communications apparatus is provided. The communications apparatus includes units or means configured to perform the steps in the method according to the third aspect and/or the seventh aspect. The communications apparatus may be a base station, or may be at least one processing element or chip.

According to a fourteenth aspect, a communications apparatus is provided. The communications apparatus includes a transceiver, a memory, and a processor. The processor is coupled to the memory and the transceiver. The memory is configured to store a program. The processor invokes the program stored in the memory, to perform the method according to the third aspect and/or the seventh aspect. The transceiver is configured to receive and/or send information. The communications apparatus may be a base station, or may be at least one processing element or chip.

According to a fifteenth aspect, a communications apparatus is provided. The communications apparatus includes units or means configured to perform the steps in the method according to the fourth aspect and/or the eighth aspect. The communications apparatus may be a terminal, or may be at least one processing element or chip.

According to a sixteenth aspect, a communications apparatus is provided. The communications apparatus includes a transceiver, a memory, and a processor. The processor is coupled to the memory and the transceiver. The memory is configured to store a program. The processor invokes the program stored in the memory, to perform the method according to the fourth aspect and/or the eighth aspect. The transceiver is configured to receive and/or send information. The communications apparatus may be a terminal, or may be at least one processing element or chip.

According to a seventeenth aspect, a communications system is provided. The system includes the core network element, the parameter configuration network element, the base station, and/or the terminal according to the foregoing aspects.

In another possible design, the system further includes another device that interacts with the core network element, the parameter configuration network element, the base station, and/or the terminal in the solutions provided in the embodiments of the present invention.

According to an eighteenth aspect, a computer storage medium is provided. The computer storage medium is configured to store a computer software instruction used by the foregoing communications apparatus, and the computer software instruction includes a program designed for executing the foregoing aspects.

According to a nineteenth aspect, a computer program product including an instruction is further provided. When the computer program product is run on a computer, the computer is enabled to perform the method according to the foregoing aspects.

According to a twentieth aspect, a chip system is provided. The chip system includes a processor, used by a communications apparatus to implement functions in the foregoing aspects, for example, obtain or process data and/or information in the foregoing method. In a possible design, the chip system further includes a memory, and the memory is configured to store a program instruction and data that are necessary for the communications apparatus. The chip system may include a chip, or may include a chip and another discrete component.

In the solutions provided in the embodiments of the present invention, the terminal may send, to the core network element, the request message used to request the information used for the PC5 interface-based communication of the terminal, so that the core network element can send, to the terminal based on the request message, the QoS rule used for the PC5 interface-based communication. In this way, the QoS information used for the PC5 interface-based communication can be obtained from the network side. This helps improve the reliability and flexibility of the obtained QoS information, and prevents the QoS information from being modified without authorization.

BRIEF DESCRIPTION OF DRAWINGS

To describe the technical solutions in the embodiments of the present invention or in the background more clearly, the following describes the accompanying drawings in the embodiments of the present invention or the background.

FIG. 8a-1 and FIG. 8a-2 are a schematic interaction diagram of still another communication method according to an embodiment of the present invention;

FIG. 8b-1 and FIG. 8b-2 are a schematic interaction diagram of still another communication method according to an embodiment of the present invention;

DESCRIPTION OF EMBODIMENTS

The technical solutions of this application may be applied to various communications systems, for example, a universal mobile telecommunications system (UMTS for short) and a long term evolution (LTE for short) network. With continuous development of communications technologies, the technical solutions of this application may further be applied to a future network, for example, a 5G network that may also be referred to as a new radio (NR for short) network, or may be applied to a D2D (device to device) network, an M2M (machine to machine) network, or the like.

Figure 1:
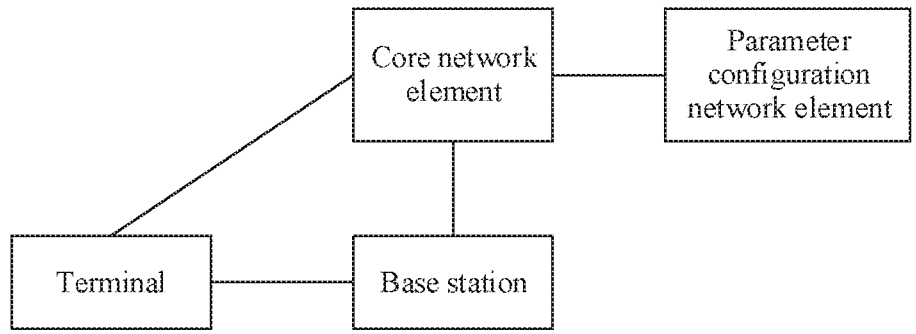
FIG. 1 is a schematic diagram of a communications system.

FIG. 1 is a schematic diagram of a communications system according to this application. As shown in FIG. 1, the communications system may include a terminal, a base station, a core network element, and a parameter configuration network element. The terminal, the base station, the core network element, and the parameter configuration network element may communicate with each other through the foregoing communications systems such as an LTE system or a 5G system, for example, to obtain information used for PC5 interface-based communication, thereby implementing transmission of a V2X message based on the PC5 interface-based communication. The V2X communication includes vehicle-to-vehicle V2V communication, vehicle-to-pedestrian V2P communication, vehicle-to-roadside-unit V2I communication, and the like. A PC5 interface is a communications interface between terminals, and the PC5 interface-based communication is communication between the terminals.

The terminal is a device having a communication function, and may include a handheld device having a wireless communication function, a vehicle-mounted device, a wearable device, a computing device, another processing device connected to a wireless modem, or the like. The terminal may have different names in different networks, for example, a terminal, user equipment (UE for short), a mobile station, a subscriber unit, a station, a cellular phone, a personal digital assistant, a wireless modem, a wireless communications device, a handheld device, a laptop computer, a cordless phone, and a wireless local loop station. The terminal may be a wireless terminal or a wired terminal. The wireless terminal may be a device that provides a user with voice and/or data connectivity, the handheld device having a wireless connection function, or the another processing device connected to the wireless modem. The wireless terminal may communicate with one or more core networks through a radio access network (RAN).

The core network element may be a network element that requests, for the terminal, information used for PC5 interface-based communication, and includes a mobility management network element or a session management function network element. For example, the core network element may be specifically an access and mobility management function (AMF for short) entity, a session management function (SMF for short) entity, a mobility management entity (MME for short), a serving gateway (S-GW for short), or a packet data network gateway (P-GW for short). The parameter configuration network element may be a network element that obtains the information used for the PC5 interface-based communication, for example, may be a network element that allocates, to the terminal, the information used for the PC5 interface-based communication. For example, the parameter configuration network element may be a policy and charging function (PCF for short) entity, a policy and charging rules function (PCRF for short) entity, a V2X parameter configuration network element such as a V2X control function, or a session management network element such as an SMF. Examples are not listed one by one herein.

This application discloses a communications method and apparatus, to obtain, from a network side, QoS information used for PC5 interface-based communication, thereby improving reliability of the obtained QoS information, and preventing the QoS information from being modified without authorization. Details are separately described below.

Figure 2A:
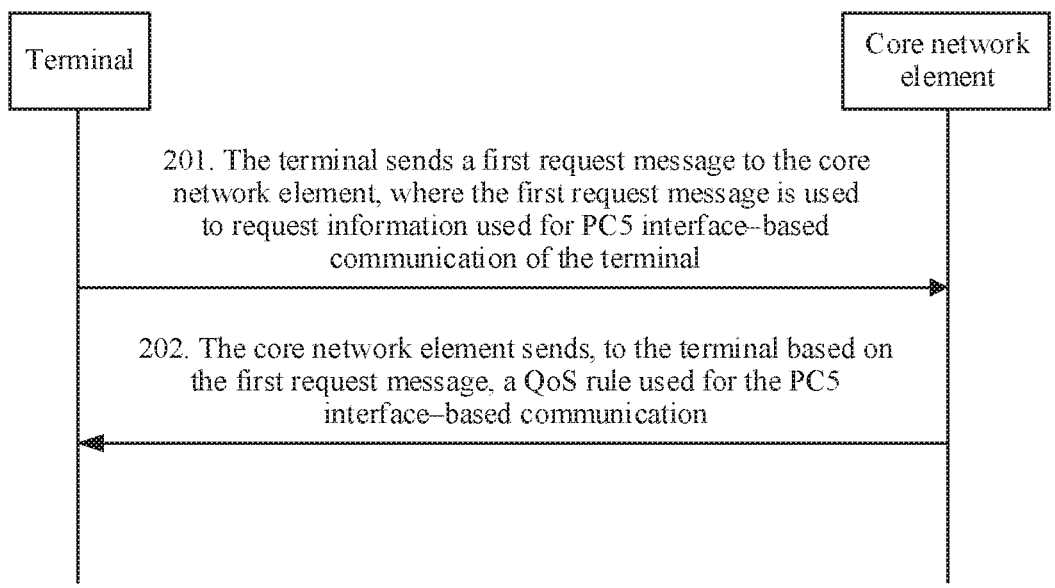
FIG. 2a is a schematic interaction diagram of a communication method according to an embodiment of the present invention.

FIG. 2a is a schematic interaction diagram of a communication method according to an embodiment of the present invention. As shown in FIG. 2a, the method may include the following steps.

201. A terminal sends a first request message to a core network element, where the first request message is used to request information used for PC5 interface-based communication of the terminal.

For example, the terminal may send the first request message to a base station, and then the base station may forward the first request message to the core network element. In other words, the terminal may send the first request message to the core network element through the base station.

The core network element may be a mobility management network element or a session management function network element.

In a replaceable scenario, the first request message is used to request information used for V2X communication or communication information, where the information used for the V2X communication or the communication information includes the information for the PC5 interface-based communication of the terminal.

The first request message may be a message such as a registration request (for example, may include (a registration type, a UE identity (such as a subscription concealed identifier (SUCI) or a 5G globally unique temporary identity (5G-GUTI)), a UE 5GC capability UE 5GC capability, or a PDU session status PDU session status)) a service request (for example, may include a list of PDU sessions to be activated list of PDU sessions to be activated or a PDU session status PDU session status, where in this scenario, the terminal may first send a UE identity to the base station, and then the base station sends the UE identity and the service request to an AMF together); a PDU session establishment request (for example, may include a PDU session identifier PDU session ID or a requested PDU type requested PDU type, where in this scenario, an AMF may send a UE identity (for example, a subscription permanent identifier (SUPI)) and the PDU session establishment request to an SMF together); a PDU session modification request (for example, may include a PDU session ID or an operation type operation); or a NAS message (for example, may include single network slice selection assistance information (S-NSSAI), a data network name (DNN), a PDU session ID, or a PDU session establishment request PDU session establishment request); or may be a newly added message (new message for short). This is not limited in this application.

Further optionally, the first request message further includes (carries) first indication information, where the first indication information may be used to indicate that the first request message is used to request the information used for the PC5 interface-based communication.

It is clear that in the foregoing replaceable scenario, the first indication information may be used to indicate that the first request message is used to request the information used for the V2X communication or a communication parameter used for the V2X communication, and the information used for the V2X communication or the communication parameter includes the information for the PC5 interface-based communication of the terminal.

The information used for the PC5 interface-based communication of the terminal may include information such as a PCC rule (s), a QoS rule, or a QoS profile.

202. The core network element sends, to the terminal based on the first request message, the QoS rule used for the PC5 interface-based communication.

For example, the core network element receives the first request message from the terminal through the base station, obtains, based on the first request message, the QoS rule (s) used for the PC5 interface-based communication of the terminal, and sends the QoS rule to the terminal through the base station.

The QoS rule used for the PC5 interface-based communication of the terminal may be obtained based on the first request message in a plurality of implementations, as described below.

Manner 1: The core network element obtains, based on the first request message, the QoS rule from information stored in the core network element.

For example, the core network element stores the information used for the PC5 interface-based communication of the terminal, where the information for the PC5 interface-based communication includes the QoS rule. In this way, the core network element can obtain, after receiving the first request message, the QoS rule from the stored information.

Manner 2: The core network element obtains the QoS rule from unified data management (UDM for short) based on the first request message.

For example, the core network element obtains subscription information of the terminal from the UDM (where the UDM obtains the subscription information of the terminal from a unified data repository (UDR for short)), where the subscription information includes the QoS rule, so that the core network element obtains the QoS rule from the subscription information. Specifically, the first request message may carry an identifier of the terminal, so that the core network element can obtain the QoS rule from the subscription information based on the identifier of the terminal.

Manner 3: The core network element obtains the QoS rule from a parameter configuration network element based on the first request message.

For Manner 3, refer to related descriptions of the third or the fourth implementation scenario in the embodiment shown in FIG. 2a. Details are not described again.

In this embodiment of the present invention, the terminal may send, to the core network element, the request message used to request the information used for the PC5 interface-based communication of the terminal, so that the core network element can send, to the terminal based on the request message, the QoS rule used for the PC5 interface-based communication. In this way, QoS information used for the PC5 interface-based communication can be obtained from a network side. This helps improve reliability and flexibility of the obtained QoS information, and prevents the QoS information from being modified without authorization.

Optionally, in the first implementation scenario of the foregoing method, the method further includes: sending, by the core network element to the base station based on the first request message, the QoS profile used for the PC5 interface-based communication.

The QoS profile is used by the base station to perform QoS processing for the PC5 interface-based communication. The QoS profile may be referred to as a QoS profile, a QoS attribute, a QoS configuration file, a QoS context, or the like. This is not limited in this application.

For example, the core network element receives the first request message from the terminal through the base station, obtains, based on the first request message, the QoS profile used for the PC5 interface-based communication, and sends the QoS profile to the base station.

Correspondingly, the base station may receive, from the core network element, the QoS profile used for the PC5 interface-based communication, and then may negotiate with the terminal by using RRC signaling, to bind a QoS flow (for example, a QoS flow of a PDU session or a PDU session) on a PC5 interface to a corresponding PC5 interface resource.

The following manners may be used by the core network element to obtain, based on the first request message, the QoS profile used for the PC5 interface-based communication.

Manner 1: The core network element obtains, based on the first request message, the QoS profile from the information stored in the core network element.

Manner 2: The core network element obtains the QoS profile from the UDM based on the first request message.

Manner 3: The core network element obtains the QoS profile from the parameter configuration network element based on the first request message.

For Manner 1 to Manner 3, refer to the related descriptions of Manner 1 to Manner 3 in step 202. To be specific, the QoS rule in the related descriptions of Manner 1 to Manner 3 in step 202 is replaced with the QoS profile. Details are not described again.

Optionally, in the second implementation scenario of the foregoing method, the method further includes:

obtaining, by the terminal, scheduled-resource information according to the QoS rule, and sending a V2X message on a resource corresponding to the scheduled-resource information.

The scheduled-resource information may be requested by the terminal from the base station, or may be determined by the terminal according to the QoS rule. Further optionally, the QoS profile may include one or more of information such as a 5G QoS identifier (5QI), an allocation and retention priority (ARP), a reflective QoS attribute (RQA), a guaranteed flow bit rate (GFBR), a maximum flow bit rate (MFBR), a correspondence between a data packet processing priority and a PPPP, a correspondence between a data packet delay requirement and a PPPP, and a correspondence between a data packet loss rate and ProSe per-packet reliability (PPPR for short). The QoS rule may include: one or more of information such as a QoS rule identifier, a QoS flow identifier (QFI), a packet filter set in an SDF template, the 5QI, a guaranteed bit rate (GBR), a maximum bit rate (MBR), a correspondence between an application identifier and a PPPP, the correspondence between a data packet processing priority and a PPPP, the correspondence between a data packet delay requirement and a PPPP, and the correspondence between a data packet loss rate and a PPPR. Usually, the QoS profile does not include the QFI.

For example, the V2X message of the terminal is classified into a corresponding QoS flow of a PDU session by using the SDF template in the QoS rule. The terminal may send a scheduling request to the base station, where the scheduling request includes an identifier of the QoS rule, and the identifier of the QoS rule may include the QoS rule identifier, the 5QI, or an identifier of the QoS flow of the PDU session (for example, the QoS flow ID, or the PDU session ID and the QoS flow ID). The base station receives the scheduling request from the terminal, and may determine the scheduled-resource information for the terminal based on the identifier of the QoS rule, for example, determine corresponding QoS requirement information for the terminal based on the identifier of the QoS rule and the QoS profile (where for example, a mapping relationship is preconfigured between the identifier of the QoS rule and QoS profile information, so that the base station can determine a QoS requirement based on the QoS profile information). Further, the base station allocates a scheduled resource to the terminal based on the QoS requirement information, and sends, to the terminal, information about the scheduled resource, namely, the scheduled-resource information. The terminal may receive the scheduled-resource information from the base station, and send the V2X message on the resource corresponding to the scheduled-resource information.

For another example, the terminal and the base station establish a mapping relationship between the QoS flow of the PDU session and a logical channel group identity (LCGID for short) by using radio resource control (RRC for short) signaling based on the QoS rule and the QoS profile (where the terminal and the base station both have the mapping relationship). Further, the terminal may send a scheduling request to the base station, where the scheduling request includes the LCGID. Further, the base station allocates a corresponding PC5 interface resource, namely, a scheduled resource, to the terminal based on the LCGID, and sends information about the scheduled resource to the terminal. The terminal may receive the scheduled-resource information from the base station, and send the V2X message on the resource corresponding to the scheduled-resource information.

For still another example, based on the QoS rule and the QoS profile, the terminal may establish a mapping relationship between the QoS rule and a PPPP, and the base station may establish a mapping relationship between the QoS profile and the PPPP. In this case, the terminal may send a scheduling request to the base station, where the scheduling request includes an identifier of the QoS rule, and the identifier of the QoS rule may include PPPP information. Further, the base station may determine corresponding QoS profile information based on the PPPP, allocates a corresponding PC5 interface resource, namely, a scheduled resource, to the terminal based on the corresponding QoS profile information, and sends information about the scheduled resource to the terminal. The terminal may receive the scheduled-resource information from the base station, and send the V2X message on the resource corresponding to the scheduled-resource information.

It should be understood that the QoS rule used for the PC5 interface-based communication and a QoS rule used for a Uu interface may include different information. For example, the QoS rule used for the PC5 interface-based communication may include the packet filter set in the SDF template, the 5QI, or the correspondence between an application identifier and a PPPP, and optionally, may further include the correspondence between a data packet processing priority and a PPPP, the correspondence between a data packet delay requirement and a PPPP, the correspondence between a data packet loss rate and a PPPR, or the like. The QoS profile used for the PC5 interface-based communication may include only the 5QI or the ARP, or may include the correspondence between a data packet processing priority and a PPPP, the correspondence between a data packet delay requirement and a PPPP, the correspondence between a data packet loss rate and a PPPR, or the like. In a future network, the PCC rule, the QoS rule, and/or the QoS profile may alternatively have other names. This is not limited in this application.

For another example, the terminal may obtain QoS requirement information of the V2X message according to the QoS rule, and determine the scheduled-resource information based on the QoS requirement information, to send the V2X message on the resource corresponding to the scheduled-resource information.

Optionally, in the third implementation scenario of the foregoing embodiment, the core network element is the session management function network element, and the method further includes:

sending, by the session management function network element, a second request message to the parameter configuration network element based on the first request message, where the second request message is used to request the information used for the PC5 interface-based communication;

sending, by the parameter configuration network element to the session management function network element based on the second request message, the PCC rule used for the PC5 interface-based communication; and receiving, by the session management function network element, the PCC rule from the parameter configuration network element, and obtaining the QoS rule according to the PCC rule.

The PCC rule used for the PC5 interface-based communication is obtained based on the second request message in the following implementations.

Manner 1: The parameter configuration network element obtains, based on the second request message, the PCC rule from information stored in the parameter configuration network element.

Manner 2: The parameter configuration network element obtains the PCC rule from the UDR based on the second request message.

Manner 3: The parameter configuration network element obtains the PCC rule from a PCF based on the second request message.

For example, after identifying that the first request message is used to request the information for the PC5 interface-based communication, for example, when determining that the first request message is a specific message, such as the PDU session establishment request or the PDU session modification request, or that the first request message carries the first indication information, the session management function network element may determine that the first request message is used to request the information for the PC5 interface-based communication. Further, the session management function network element may send the second request message to the parameter configuration network element. After receiving the second request message, the parameter configuration network element may obtain, from the information stored in the parameter configuration network element, the information used for the PC5 interface-based communication, such as the PCC rule; or may obtain, from the subscription information of the terminal (where for example, the parameter configuration network element may obtain the subscription information of the terminal from the UDR), the PCC rule used for the PC5 interface-based communication; or may obtain, from the PCF, the PCC rule used for the PC5 interface-based communication.

Optionally, in the fourth implementation scenario of the foregoing embodiment, the core network element is the mobility management network element, and the method further includes:

sending, by the mobility management network element, a second request message to the parameter configuration network element based on the first request message, where the second request message is used to request the information used for the PC5 interface-based communication;

sending, by the parameter configuration network element to the mobility management network element based on the second request message, the QoS rule used for the PC5 interface-based communication; and receiving, by the mobility management network element, the QoS rule from the parameter configuration network element.

The QoS rule used for the PC5 interface-based communication is obtained based on the second request message in the following implementations.

Manner 1: The parameter configuration network element obtains, based on the second request message, the QoS rule from information stored in the parameter configuration network element.

Manner 2: The parameter configuration network element obtains the QoS rule from the UDR based on the second request message.

Manner 3: The parameter configuration network element obtains the QoS rule from a PCF based on the second request message.

For example, after receiving the first request message, the mobility management network element may send the second request message to the parameter configuration network element. After receiving the second request message, the parameter configuration network element may obtain, from the information stored in the parameter configuration network element, the information used for the PC5 interface-based communication, such as the QoS rule; or may obtain, from the subscription information of the terminal (where for example, the parameter configuration network element may obtain the subscription information of the terminal from the UDR), the QoS rule used for the PC5 interface-based communication; or may obtain, from the PCF, the QoS rule used for the PC5 interface-based communication.

Optionally, with reference to the third or the fourth implementation scenario, the second request message further includes second indication information, where the second indication information is used to indicate that the second request message is used to request the information used for the PC5 interface-based communication; or the second indication information is used to indicate that the second request message is used to request the information used for the V2X communication. The information used for the V2X communication includes the information for the PC5 interface-based communication. The second request message may be an Npcf_SMPolicyControl_Create message (for example, may include the SUPI, the PDU session ID, a PDU session type, the DNN, or an access type) sent by the SMF to a PCF, an Npcf_AMPolicyControl_Create message (for example, may include the SUPI) sent by the AMF to the PCF, a new message (for example, may include the SUPI) sent by the AMF to a V2X control function, or an Nsmf_PDUSession_CreateSMContext Request message (for example, may include the SUPI, the DNN, the S-NSSAI, the PDU session ID, or an N1 SM container (the PDU session establishment request)) sent by the AMF to the SMF.

Optionally, with reference to the first implementation scenario, the core network element may further send third indication information to the base station, and the base station may receive the third indication information from the core network element. The third indication information may be used to indicate that the QoS profile is used for the PC5 interface-based communication.

Further optionally, with reference to the third or the fourth implementation scenario, the parameter configuration network element may further indicate, to the core network element, that the information used for the PC5 interface-based communication is used for the PC5 interface-based communication. For example, if the information that is used for the PC5 interface-based communication and that is sent by the parameter configuration network element to the core network element is the PCC rule, the parameter configuration network element may further send fourth indication information to the core network element. The core network element may further receive the fourth indication information from the parameter configuration network element, where the fourth indication information may be used to indicate that the PCC rule is used for the PC5 interface-based communication. For another example, if the information that is used for the PC5 interface-based communication and that is sent by the parameter configuration network element to the core network element is the QoS rule and/or the QoS profile, the parameter configuration network element may further send fourth indication information to the core network element. The core network element receives the fourth indication information from the parameter configuration network element, where the fourth indication information may be used to indicate that the QoS rule and/or the QoS profile are/is used for the PC5 interface-based communication.

Optionally, with reference to the third or the fourth implementation scenario, the parameter configuration network element may be a PCF network element (PCF for short below), a V2X parameter configuration network element such as the V2X control function, or a session management function network element such as an SMF. When the parameter configuration network element is the V2X parameter configuration network element, the V2X parameter configuration network element may further send a third request message to the PCF network element, where the third request message is used to request, from the PCF, the information used for the PC5 interface-based communication. Further, the PCF may send, to the V2X parameter configuration network element based on the third request message, the PCC rule for the PC5 interface-based communication, and the V2X parameter configuration network element may receive the PCC rule that is used for the PC5 interface-based communication and that is sent by the PCF. Alternatively, the PCF may send, to the V2X parameter configuration network element based on the third request message, the QoS rule and/or the QoS profile that are/is used for the PC5 interface-based communication, and the V2X parameter configuration network element may receive the QoS rule and/or the QoS profile that are/is used for the PC5 interface-based communication and that are/is sent by the PCF. A manner in which the PCF sends, to the V2X parameter configuration network element based on the third request message, the information used for the PC5 interface-based communication is similar to the foregoing manner in which the parameter configuration network element sends, based on the second request message, the information used for the PC5 interface-based communication. Details are not described herein again. For example, the third request message may be a new message (for example, may include the SUPI). Further optionally, the third request message may further include fifth indication information, where the fifth indication information may be used to indicate that the third request message is used to request the information used for the PC5 interface-based communication; or the fifth indication information may be used to indicate that the third request message is used to request the information used for the V2X communication, and the information used for the V2X communication includes the information for the PC5 interface-based communication. Further optionally, the PCF may further send sixth indication information to the V2X parameter configuration network element, where the sixth indication information may be used to indicate that the PCC rule is used for the PC5 interface-based communication, or may be used to indicate that the QoS rule and/or the QoS profile are/is used for the PC5 interface-based communication.

Further optionally, when the parameter configuration network element is the SMF, the SMF may further send a third request message to the PCF network element, where the third request message is used to request, from the PCF, the information used for the PC5 interface-based communication. Further, the PCF may send, to the SMF based on the third request message, the PCC rule for the PC5 interface-based communication, and the SMF may receive the PCC rule that is used for the PC5 interface-based communication and that is sent by the PCF. Alternatively, the PCF may send, to the SMF based on the third request message, the QoS rule and/or the QoS profile that are/is used for the PC5 interface-based communication, and the SMF may receive the QoS rule and/or the QoS profile that are/is used for the PC5 interface-based communication and that are/is sent by the PCF. The third request message may be an Npcf_SMPolicyControl_Create message (the SUPI, the PDU session ID, the PDU session type, the DNN, or the access type).

Further optionally, with reference to the first implementation scenario, the third indication information may further be used to indicate that the QoS rule is used for the PC5 interface-based communication, and the base station may further forward the third indication information to the terminal. Alternatively, the core network element may further send seventh indication information to the terminal, where the seventh indication information may be used to indicate that the QoS rule is used for the PC5 interface-based communication.

Further optionally, with reference to the first, the second, the third, or the fourth implementation scenario, the core network element may skip triggering establishment of (does not establish) an N3 tunnel and an N4 tunnel for the PDU session. For example, when the first request message is the PDU session establishment request or the PDU session modification request, the core network element may skip triggering, based on the first request message, the establishment of the N3 tunnel and the N4 tunnel for the PDU session. For another example, when the first request message (for example, the new message) carries the first indication information, the core network element skips triggering the establishment of the N3 tunnel and the N4 tunnel. For still another example, when the core network element receives the fourth indication information, the core network element skips triggering the establishment of the N3 tunnel and the N4 tunnel. Further, the base station may further not establish an air-interface DRB and/or an N3 tunnel for the PDU session. For example, the base station may skip triggering, based on the first request message, the establishment of the air-interface DRB and/or the N3 tunnel for the PDU session. For another example, when the first request message carries the first indication information, the base station skips triggering the establishment of the air-interface DRB and/or the N3 tunnel for the PDU session. For still another example, when the base station receives the third indication information, the base station skips triggering the establishment of the air-interface DRB and/or the N3 tunnel for the PDU session. Alternatively, the base station skips triggering establishment of an N3 tunnel for the PDU session, but may establish an air-interface DRB, to reuse an existing scheduling mechanism such as a Uu interface scheduling mechanism. When identifying that the PC5 interface-based communication is to be performed, the base station schedules a resource used for the PC5 interface-based communication, thereby reducing complexity of air-interface resource scheduling. The N3 tunnel may be a tunnel between the base station and a user plane function (UPF for short) network element, and the N4 tunnel may be a tunnel between the SMF and the UPF. That the core network element skips triggering the establishment of the N3 tunnel for the PDU session may mean that information sent by the SMF to the base station does not include core network tunnel information of the PDU session, and the core network tunnel information is used to establish the N3 tunnel for the PDU session. That the base station skips triggering the establishment of the N3 tunnel for the PDU session may mean that information returned by the base station to the SMF does not include base station tunnel information, and the base station tunnel information is used to establish the N3 tunnel for the PDU session. That the core network element skips triggering the establishment of the N4 tunnel for the PDU session may mean that the SMF does not send an N4 interface session establishment request message N4 session establishment request message to the UPF for the PDU session.

Optionally, with reference to the first, the second, the third, or the fourth implementation scenario, when it is determined (for example, based on the first request message, the first indication information, and/or the third indication information) that the PDU session is used for the PC5 interface-based communication, and there is no data transmission on the PDU session, the base station skips initiating a network release (AN release) procedure. For example, even though a timer is set and expires, the AN release procedure is not initiated if there is no data transmission on the PDU session.

Optionally, with reference to the first, the second, the third, or the fourth implementation scenario, when it is determined that the PDU session is used for the PC5 interface-based communication and there is no data transmission on the PDU session, the core network element such as the SMF, the base station, and/or the terminal skip/skips initiating a PDU session deactivation (selective deactivation of UP connection of an existing PDU session) procedure. For example, even though a timer is set and expires, the PDU session deactivation procedure is not initiated if there is no data transmission on the PDU session.

Further optionally, with reference to the first, the second, the third, or the fourth implementation scenario, the core network element may further store, for example, in context information of the terminal, the information (for example, the PCC rule, or the QoS rule and/or the QoS profile) used for the PC5 interface-based communication. Optionally, the core network element may further add an indication for the information used for the PC5 interface-based communication, to indicate that the information is used for the PC5 interface-based communication. For example, the core network element may store the first indication information, the fourth indication information or one piece of newly added indication information in the context information of the terminal. Alternatively, the core network element may indicate, in another manner, that the information is used for the PC5 interface-based communication. This is not limited in this application. Similarly, the base station may further store the QoS profile in the context information of the terminal, and may add an indication to indicate that the QoS profile is used for the PC5 interface-based communication. Details are not described herein again. In this way, the core network element and the base station can quickly identify that the stored information corresponds to the PC5 interface-based communication, to prevent the information from being inadvertently deleted.

Further optionally, the foregoing indication information such as the first indication information, the second indication information, the third indication information, the fourth indication information, the fifth indication information, the sixth indication information, and the seventh indication information may be the same (where some indication information is the same or all the indication information is the same), or may be different (where some indication information is different or all the indication information is different). This is not limited in this application. For example, the foregoing indication information may be indicated by using same mark information such as a PC5 indication.

In another optional embodiment, the core network element may alternatively obtain only the QoS profile, and send the QoS profile to the base station; and does not need to obtain the QoS rule. Alternatively, the core network element obtains only the QoS rule, and sends the QoS rule to the terminal; and does not need to obtain the QoS profile.

Figure 2B:
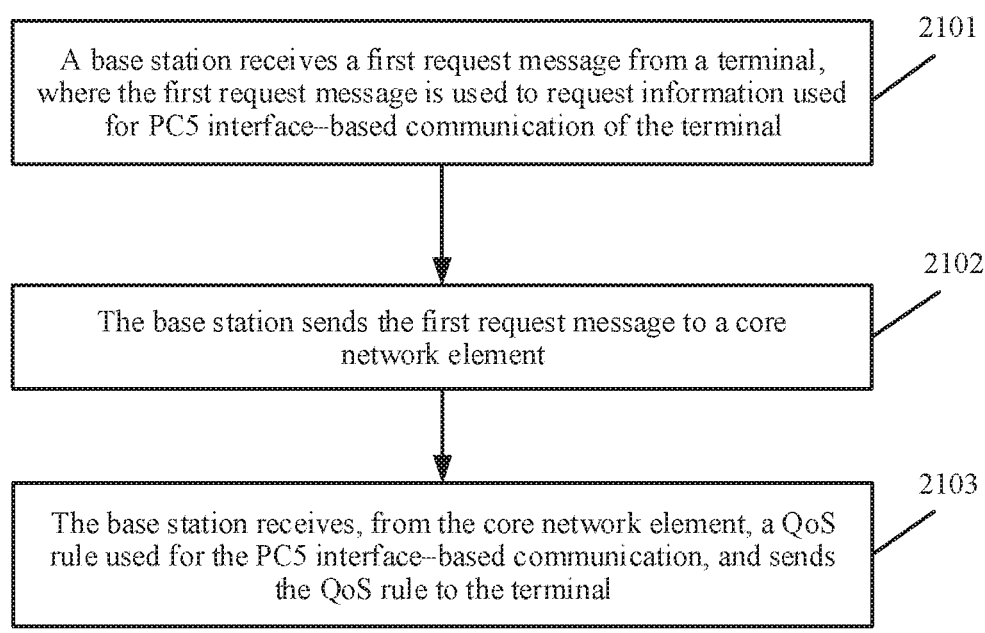
FIG. 2b is a schematic interaction diagram of another communication method according to an embodiment of the present invention.

FIG. 2b is a schematic interaction diagram of another communication method according to an embodiment of the present invention. As shown in FIG. 2b, the method may include the following steps.

2101. A base station receives a first request message from a terminal, where the first request message is used to request information used for PC5 interface-based communication of the terminal.

2102. The base station sends the first request message to a core network element.

2103. The base station receives, from the core network element, a QoS rule used for the PC5 interface-based communication, and sends the QoS rule to the terminal.

Specifically, the terminal may send the first request message to the base station. The base station receives the first request message, and may forward the first request message to the core network element. Further, the core network element may send, to the base station based on the first request message, the information such as the QoS rule that is used for the PC5 interface-based communication. The base station may receive the QoS rule sent by the core network element, and may forward the QoS rule to the terminal. The terminal may receive the QoS rule sent by the base station. For descriptions of the first request message and a process of communication between the base station and another network element, refer to the related descriptions of the embodiment in FIG. 2a. Details are not described herein again.

Figure 3:
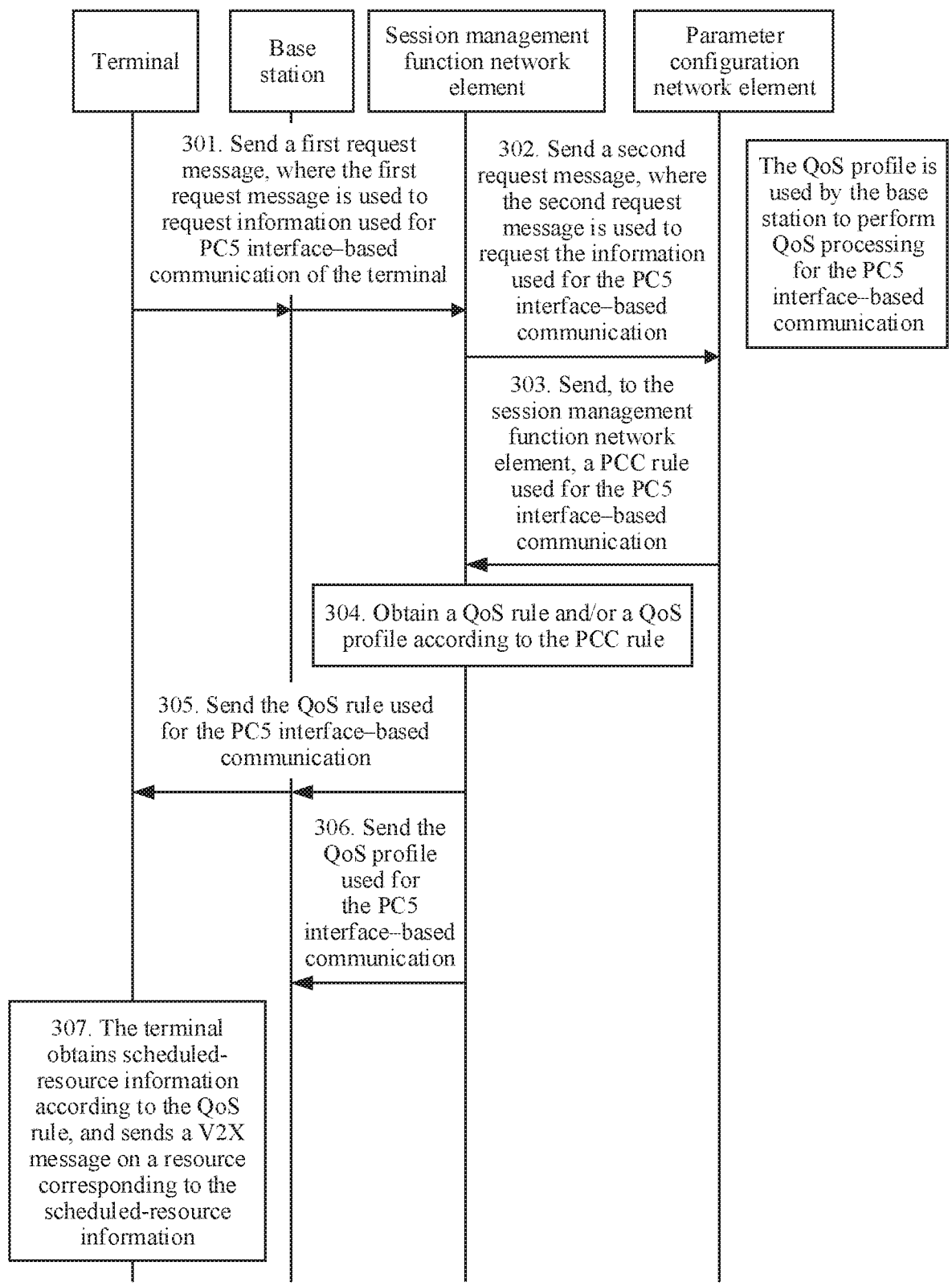
FIG. 3 is a schematic interaction diagram of still another communication method according to an embodiment of the present invention.

FIG. 3 is a schematic interaction diagram of a communication method according to an embodiment of the present invention. As shown in FIG. 3, the method may include the following steps.

301. A terminal sends a first request message to a session management function network element, where the first request message is used to request information used for PC5 interface-based communication of the terminal.

Specifically, the terminal may send the first request message to a base station, and then the base station may forward the first request message to the session management function network element. In other words, the terminal may send the first request message to the session management function network element through the base station. The first request message may be used to request the information used for the PC5 interface-based communication of the terminal, or the first request message may be used to request information used for V2X communication or other information, where the information used for the V2X communication or the other information includes the information for the PC5 interface-based communication of the terminal.

Optionally, the first request message may be a message such as a PDU session establishment request or a PDU session modification request, or may be a newly added message or the like. This is not limited in this application.

Further optionally, the first request message may further include first indication information. The first indication information may be used to indicate that the first request message is used to request the information used for the PC5 interface-based communication. Alternatively, the first indication information may be used to indicate that the first request message is used to request the information used for the V2X communication. The information used for the V2X communication includes the information for the PC5 interface-based communication.

302. The session management function network element sends a second request message to a parameter configuration network element based on the first request message, where the second request message is used to request the information used for the PC5 interface-based communication.

Optionally, the second request message may include second indication information, where the second indication information may be used to indicate that the second request message is used to request the information used for the PC5 interface-based communication. Alternatively, the second indication information may be used to indicate that the first request message is used to request the information used for the V2X communication. The information used for the V2X communication includes the information for the PC5 interface-based communication.

303. The parameter configuration network element sends, to the session management function network element based on the second request message, a PCC rule used for the PC5 interface-based communication.

Specifically, the parameter configuration network element may receive the second request message sent by the session management function network element, then may obtain, based on the second request message, the PCC rule used for the PC5 interface-based communication, and may send the PCC rule to the session management function network element.

304. The session management function network element obtains a QoS rule and/or a QoS profile according to the PCC rule.

Specifically, the session management function network element may receive, from the parameter configuration network element, the PCC rule used for the PC5 interface-based communication, and then may generate the QoS rule and/or the QoS profile according to the PCC rule, to obtain the QoS rule and/or the QoS profile that are/is used for the PC5 interface-based communication.

Further optionally, the session management function network element may store the QoS rule and/or the QoS profile in context information of the terminal, and may add an indication to indicate that the QoS rule and/or the QoS profile are/is used for the PC5 interface-based communication, for example, may associate the first indication information with the QoS rule and/or the QoS profile, and store, in the context information, the first indication information and the QoS rule and/or the QoS profile that are associated, to mark that the QoS rule and/or the QoS profile are/is used for the PC5 interface-based communication.

305. The session management function network element sends, to the terminal, the QoS rule used for the PC5 interface-based communication.

306. The session management function network element sends, to the base station, the QoS profile used for the PC5 interface-based communication.

Further, if the session management function network element obtains, according to the PCC rule, the QoS rule used for the PC5 interface-based communication, the session management function network element may send, to the terminal through the base station, the QoS rule used for the PC5 interface-based communication. If the session management function network element obtains, according to the PCC rule, the QoS profile used for PC5 interface-based communication, the session management function network element may send, to the base station, the QoS profile used for the PC5 interface-based communication. The terminal may receive the QoS rule. The base station may receive the QoS profile.

Further optionally, the session management function network element may further send third indication information to the base station, and the base station may receive the third indication information from the session management function network element. The third indication information may be used to indicate that the QoS profile is used for the PC5 interface-based communication.

Further optionally, the parameter configuration network element may further send fourth indication information to the session management function network element. The session management function network element may further receive the fourth indication information from the parameter configuration network element, where the fourth indication information may be used to indicate that the PCC rule is used for the PC5 interface-based communication.

307. The terminal obtains scheduled-resource information according to the QoS rule, and sends a V2X message on a resource corresponding to the scheduled-resource information.

Further optionally, the session management function network element may further skip triggering establishment of an N3 tunnel and an N4 tunnel for a PDU session, and the base station may further skip triggering establishment of an air-interface DRB and an N3 tunnel for the PDU session. For details, refer to the related descriptions of the embodiment shown in FIG. 2a, and the details are not described herein again.

Further optionally, the base station may store the QoS profile in context information of the terminal, and may add an indication to indicate that the QoS profile is used for the PC5 interface-based communication, for example, may associate the first indication information with the QoS profile and store, in the context information, the first indication information and the QoS profile that are associated; or may associate the third indication information with the QoS profile and store, in the context information, the third indication information and the QoS profile that are associated, to mark that the QoS profile is used for the PC5 interface-based communication. In this way, the base station can quickly identify that the stored QoS profile corresponds to the PC5 interface-based communication, to prevent the information from being inadvertently deleted. A reason is as follows: If the base station cannot identify the stored QoS profile and does not establish the air-interface DRB or the N3 tunnel for the PDU session, the base station may delete the QoS profile.

Optionally, when it is determined that the PDU session is used for the PC5 interface-based communication and there is no data transmission on the PDU session, the session management function network element, the base station, and/or the terminal skip/skips initiating a PDU session deactivation procedure, and the base station may further skip initiating an AN release procedure. For details, refer to the related descriptions of the embodiment shown in FIG. 2a, and the details are not described herein again.

Optionally, the scheduled-resource information may be requested by the terminal from the base station, or may be determined by the terminal according to the QoS rule. For details, refer to the related descriptions of the embodiment shown in FIG. 2a, and the details are not described herein again. Further, the terminal may send the V2X message on the resource corresponding to the scheduled-resource information.

It should be understood that, in another optional embodiment, the session management function network element may alternatively send, to the terminal, a QoS rule that is stored in the session management function network element and that is used for the PC5 interface-based communication, and the terminal may receive the QoS rule; and/or the session management function network element may alternatively send, to the base station, a QoS profile that is stored in the session management function network element and that is used for the PC5 interface-based communication, and the base station may receive the QoS profile. In another optional embodiment, if the base station does not receive the QoS profile sent by the session management function network element, the base station may alternatively determine the scheduled-resource information for the terminal based on a QoS profile stored in the base station. If the terminal does not receive the QoS rule from the session management function network element, the terminal may alternatively determine the scheduled-resource information based on a QoS rule stored in the terminal.

In this embodiment of the present invention, the terminal may send, to the session management function network element, the first request message used to request the information used for the PC5 interface-based communication of the terminal, so that the session management function network element can send, to the parameter configuration network element based on the first request message, the second request message used to request the information used for the PC5 interface-based communication of the terminal, and the parameter configuration network element can send, to the session management function network element based on the second request message, the PCC rule used for the PC5 interface-based communication. Further, after obtaining the QoS rule and the QoS profile according to the PCC rule, the session management function network element can send, to the terminal, the QoS rule used for the PC5 interface-based communication, and send the QoS profile to the base station. In this way, QoS information used for the PC5 interface-based communication can be obtained from a network side, so that the terminal and the base station determine, based on the QoS rule and/or the QoS profile, the scheduled-resource information for the terminal to perform a V2X service, and there is no need to separately reconfigure a PPPP mapping mechanism for the terminal side and the base station side when a new type of V2X message needs to be deployed. This helps improve reliability and flexibility of the obtained QoS information, and prevents the QoS information from being modified without authorization, thereby reducing improper resource allocation.

Figure 4:
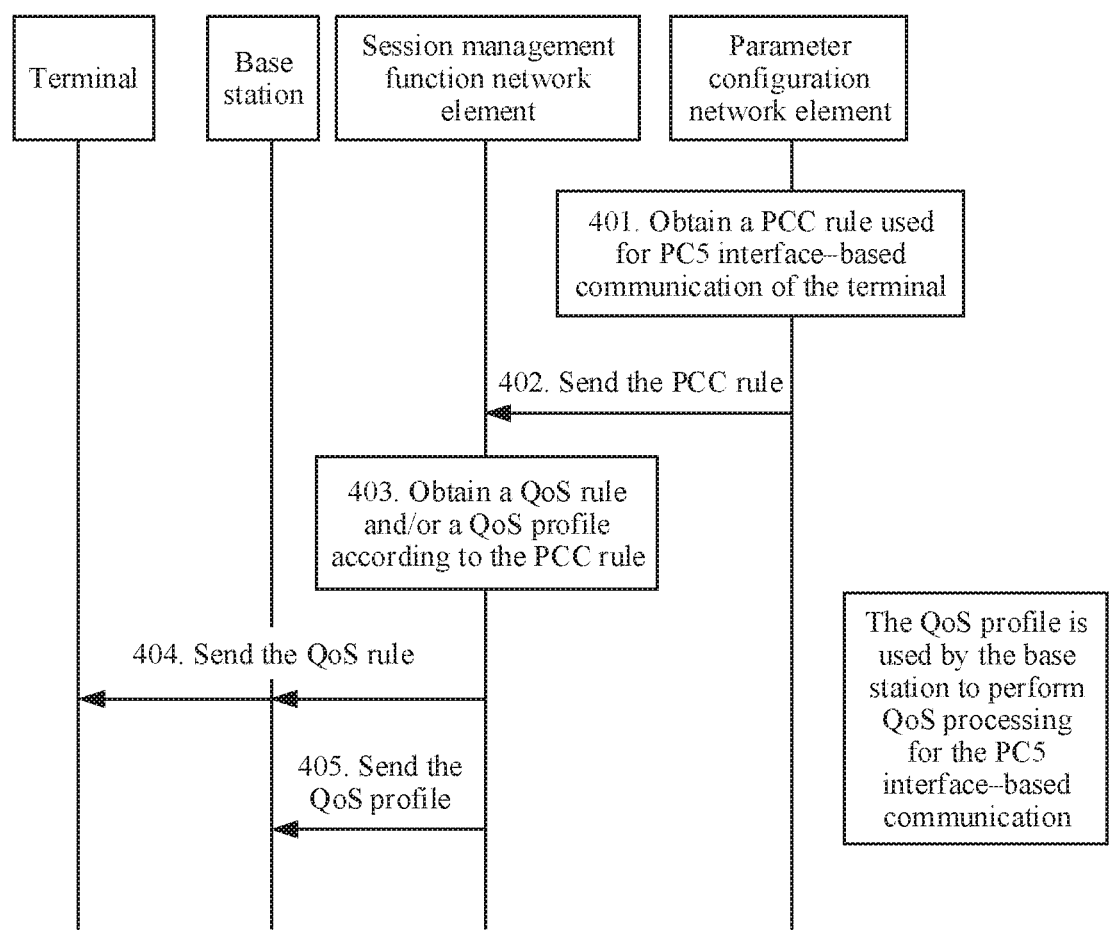
FIG. 4 is a schematic interaction diagram of still another communication method according to an embodiment of the present invention.

FIG. 4 is a schematic interaction diagram of still another communication method according to an embodiment of the present invention. As shown in FIG. 4, the method may include the following steps.

401. A parameter configuration network element obtains a PCC rule used for PC5 interface-based communication of a terminal.

Optionally, the PCC rule may be obtained by the parameter configuration network element in a preset time interval, or may be obtained by the parameter configuration network element by receiving an indication from an application server, or may be obtained when it is detected that the PCC rule is updated, or may be obtained in another manner, his is not limited in this application. For example, the terminal triggers a V2X application, for example, may request a V2X service from the application server. After receiving the request, the application server may indicate the parameter configuration network element to trigger establishment of a corresponding QoS flow for the V2X service. In this way, information such as the PCC rule that is used for the PC5 interface-based communication and that corresponds to the QoS flow is configured on the terminal. For another example, a network side such as the application server triggers, to the terminal, a V2X service corresponding to a V2X application, and indicates the parameter configuration network element to trigger establishment of a PDU session for the V2X service, to configure information such as the PCC rule that is used for the PC5 interface-based communication and that corresponds to the PDU session on the terminal.

402. The parameter configuration network element sends the PCC rule to a session management function network element.

Optionally, the parameter configuration network element sends first indication information to the session management function network element, where the first indication information is used to indicate that the PCC rule is used for the PC5 interface-based communication.

Specifically, after obtaining the PCC rule, the parameter configuration network element may send the PCC rule to the session management function network element, and may send indication information, namely, the first indication information, to the session management function network element, to indicate that the PCC rule is used for the PC5 interface-based communication. For example, one message may carry both the PCC rule and the first indication information.

403. The session management function network element obtains a QoS rule and/or a QoS profile according to the PCC rule.

404. The session management function network element sends the QoS rule to the terminal.

Optionally, the session management function network element sends second indication information to the terminal, where the second indication information is used to indicate that the QoS rule is used for the PC5 interface-based communication.

405. The session management function network element sends the QoS profile to a base station.

Specifically, for steps 403, 404, and 405, refer to the related descriptions of steps 304, 305, and 306 in the embodiment shown in FIG. 3. Details are not described herein again.

Optionally, the session management function network element sends third indication information to the base station, where the third indication information is used to indicate that the QoS profile is used for the PC5 interface-based communication.

Further, if the session management function network element obtains, according to the PCC rule, the QoS rule used for the PC5 interface-based communication, when sending the QoS rule to the terminal through the base station, the session management function network element may further send one piece of indication information, namely, the second indication information, to the terminal through the base station, to indicate that the QoS rule is used for the PC5 interface-based communication. If the session management function network element obtains, according to the PCC rule, the QoS profile used for the PC5 interface-based communication, when sending the QoS profile to the base station, the session management function network element may further send one piece of indication information, namely, the third indication information, to the base station, to indicate that the QoS profile is used for the PC5 interface-based communication. The terminal may receive the QoS rule and the second indication information. The base station may receive the QoS profile and the third indication information. Further optionally, the second indication information and the third indication information may be independent indication information, to be specific, separately indicate that corresponding information is used for the PC5 interface-based communication. Alternatively, the second indication information and the third indication information may be a same piece of indication information, to be specific, one piece of indication information may be used to indicate that the QoS rule and the QoS profile are used for the PC5 interface-based communication. For example, the session management function network element may send one piece of indication information to the base station to indicate that the QoS rule and the QoS profile are used for the PC5 interface-based communication. After receiving the piece of indication information, the base station may send, to the terminal, the QoS rule that carries the piece of indication information. This is not limited in this application.

Further, the terminal may obtain scheduled-resource information according to the QoS rule, and send a V2X message on a resource corresponding to the scheduled-resource information. Details are not described herein.

Figures 1, 8A:
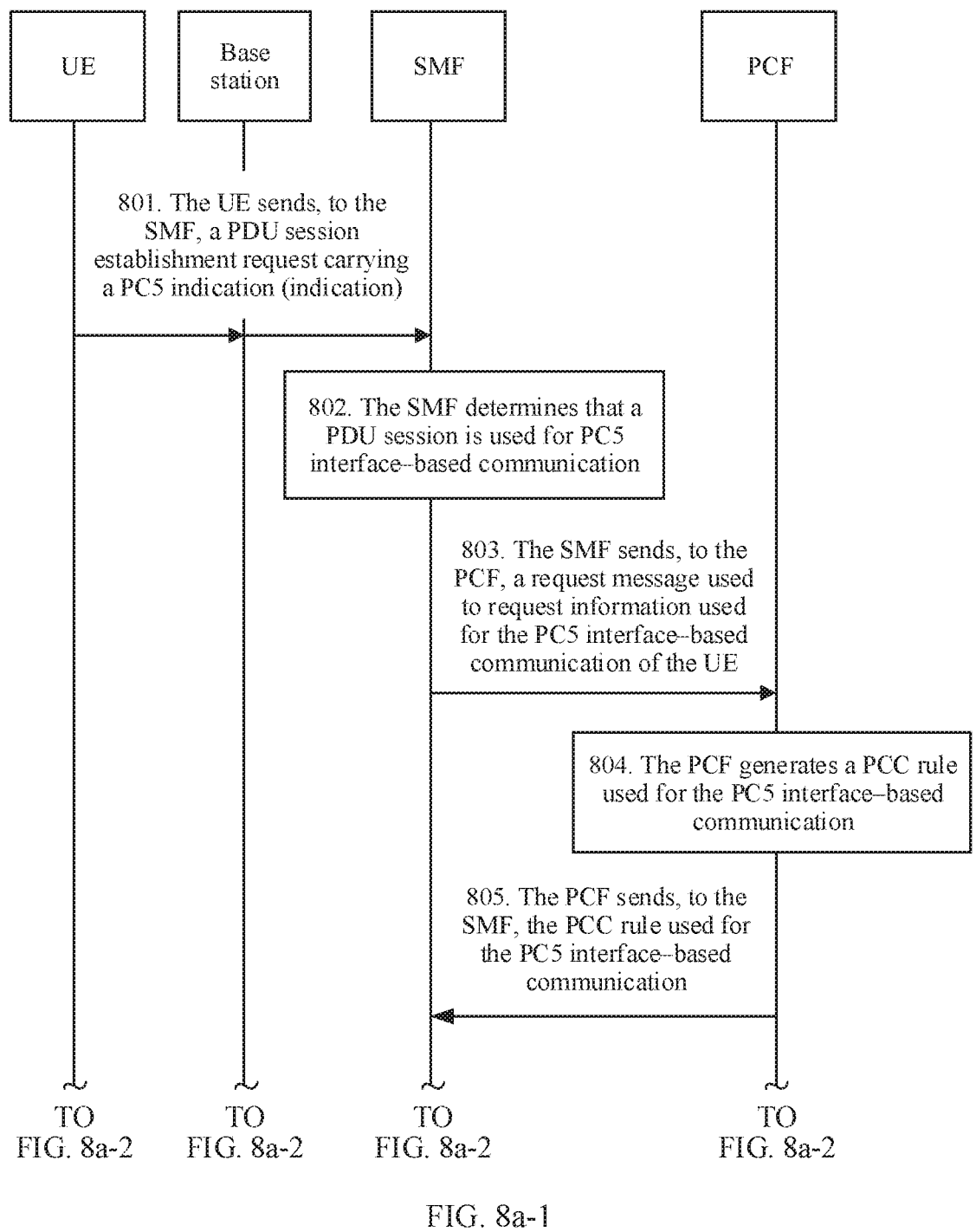
Figures 2, 8A:
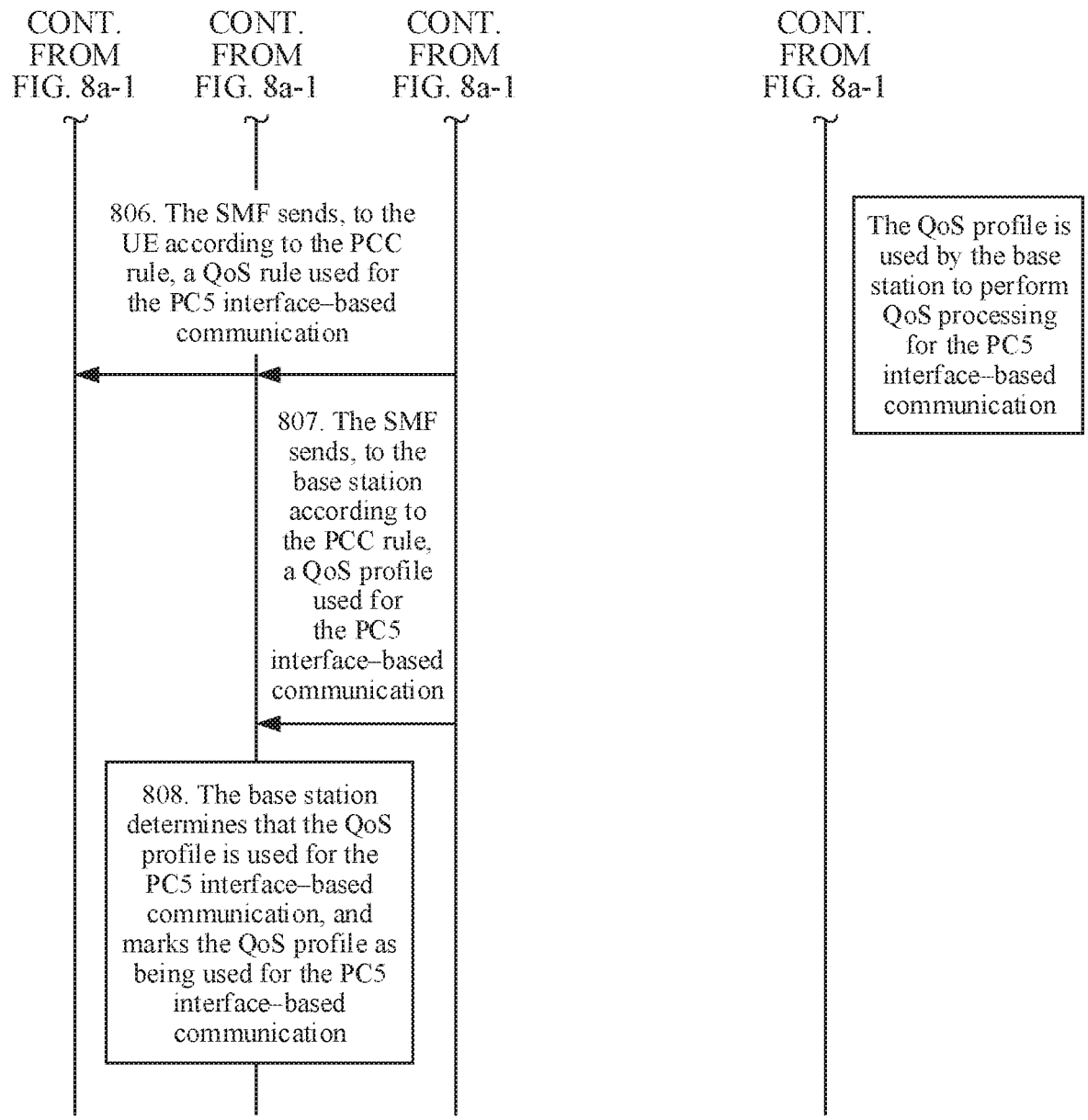

It should be understood that this embodiment may be independently implemented, or may be jointly implemented with one or more of the foregoing embodiments in FIG. 2a to FIG. 3. For example, this embodiment may be applied to update of the QoS rule and/or the QoS profile that are/is used for the PC5 interface-based communication. This is not limited in this application.

In this embodiment of the present invention, the parameter configuration network element can obtain the PCC rule used for the PC5 interface-based communication, and send, to the session management function network element, the PCC rule that carries the indication information used for the PC5 interface-based communication. Further, after obtaining the QoS rule and the QoS profile according to the PCC rule, the session management function network element can send, to the terminal, the QoS rule that carries the indication information used for the PC5 interface-based communication; and send, to the base station, the QoS profile that carries the indication information used for the PC5 interface-based communication. In this way, QoS information used for the PC5 interface-based communication can be obtained from a network side, so that the terminal and the base station determine, based on the QoS rule and the QoS profile, the scheduled-resource information for the terminal to perform a V2X service. This helps improve reliability and flexibility of the obtained QoS information, and prevents the QoS information from being modified without authorization, thereby reducing improper resource allocation.

Figure 5:
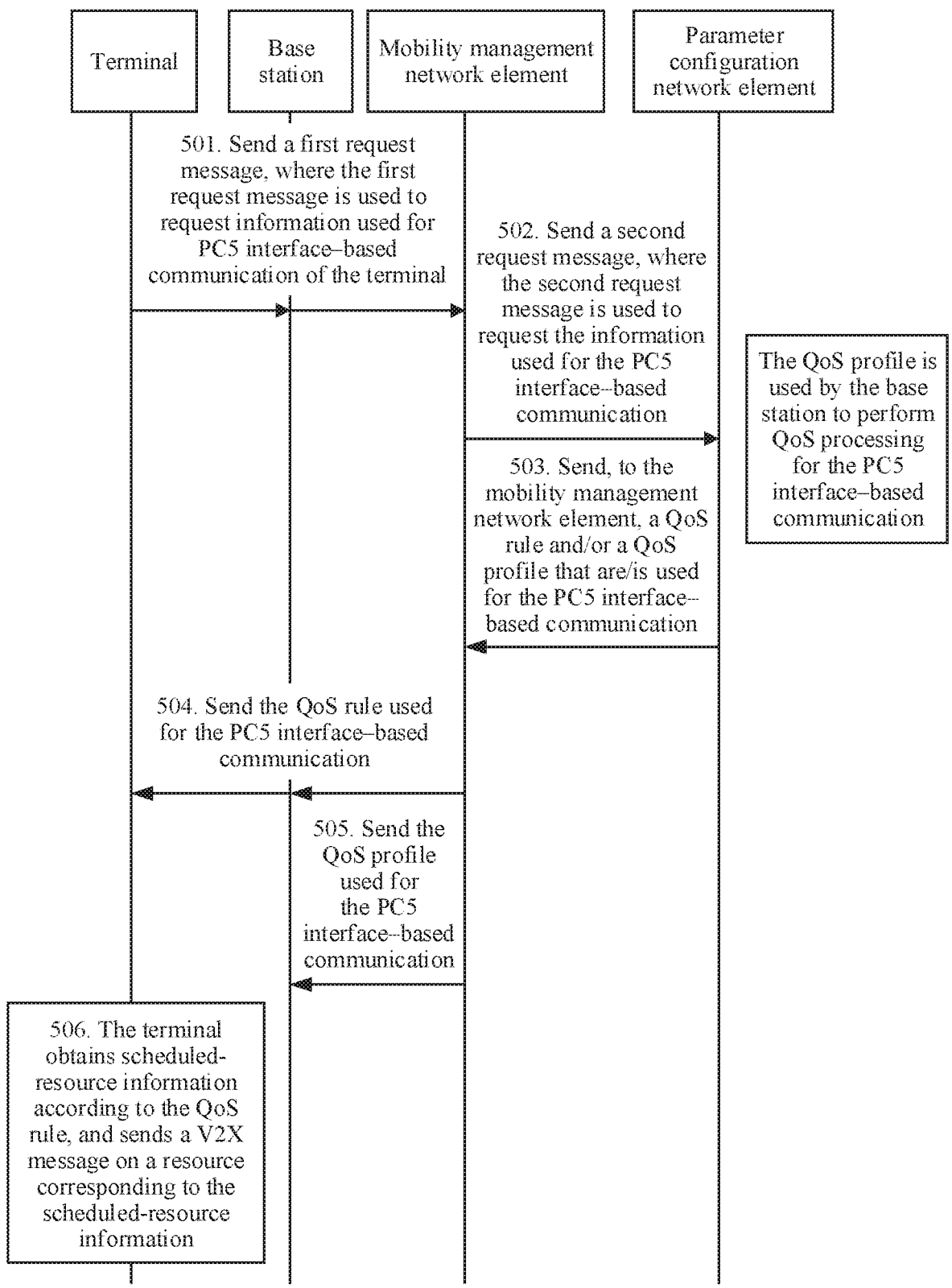
FIG. 5 is a schematic interaction diagram of still another communication method according to an embodiment of the present invention.

FIG. 5 is a schematic interaction diagram of a communication method according to an embodiment of the present invention. As shown in FIG. 5, the method may include the following steps.

501. A terminal sends a first request message to a mobility management network element, where the first request message is used to request information used for PC5 interface-based communication of the terminal.

Specifically, the terminal may send the first request message to a base station, and then the base station may forward the first request message to the mobility management network element. In other words, the terminal may send the first request message to the mobility management network element through the base station. The first request message may be used to request the information used for the PC5 interface-based communication of the terminal, or the first request message may be used to request information used for V2X communication or other information, where the information used for the V2X communication or the other information includes the information for the PC5 interface-based communication of the terminal.

Optionally, the first request message may be a message such as a registration request or a service request, or may be a newly added message or the like. This is not limited in this application. The first request message may be used to request a V2X parameter, and the V2X parameter needs to include the information used for the PC5 interface-based communication of the terminal.

Further optionally, the first request message may further include first indication information. The first indication information may be used to indicate that the first request message is used to request the information used for the PC5 interface-based communication. Alternatively, the first indication information may be used to indicate that the first request message is used to request the information used for the V2X communication. The information used for the V2X communication includes the information for the PC5 interface-based communication.

502. The mobility management network element sends a second request message to a parameter configuration network element based on the first request message, where the second request message is used to request the information used for the PC5 interface-based communication.

Optionally, the second request message may be an existing message, or may be a newly added message. For example, the parameter configuration network element may be a PCF, and the second request message may be an access and mobility policy control create Npcf_AMPolicyControl_Create message. Alternatively, the parameter configuration network element is a V2X parameter configuration network element such as a V2X control function, and the second request message may be a V2X parameter request message. Examples are not listed one by one herein.

Optionally, the second request message may include second indication information, where the second indication information may be used to indicate that the second request message is used to request the information used for the PC5 interface-based communication. Alternatively, the second indication information may be used to indicate that the second request message is used to request the information used for the V2X communication. The information used for the V2X communication includes the information for the PC5 interface-based communication.

503. The parameter configuration network element sends, to the mobility management network element based on the second request message, a QoS rule and/or a QoS profile that are/is used for the PC5 interface-based communication.

Specifically, the parameter configuration network element may receive the second request message sent by the mobility management network element, then may obtain, based on the second request message, the QoS rule and/or the QoS profile that are/is used for the PC5 interface-based communication, and sends the QoS rule and/or the QoS profile to the mobility management network element. The parameter configuration network element may obtain a PCC rule used for the PC5 interface-based communication, and then obtain the QoS rule and/or the QoS profile according to the PCC rule. Alternatively, the QoS rule and/or the QoS profile may be received by the parameter configuration network element from another network element such as a PCF.

504. The mobility management network element sends, to the terminal, the QoS rule used for the PC5 interface-based communication.

505. The mobility management network element sends, to the base station, the QoS profile used for the PC5 interface-based communication.

Specifically, the mobility management network element may receive, from the parameter configuration network element, the QoS rule and/or the QoS profile that are/is used for the PC5 interface-based communication. If the mobility management network element receives the QoS rule, the mobility management network element may send, to the terminal through the base station, the QoS rule used for the PC5 interface-based communication, in other words, the mobility management network element may perform step 504. If the mobility management network element receives the QoS profile, the mobility management network element may send, to the base station, the QoS profile used for the PC5 interface-based communication, in other words, the mobility management network element may perform step 505. Further optionally, the mobility management network element may further send third indication information to the base station, and the base station may receive the third indication information from the mobility management network element. The third indication information may be used to indicate that the QoS profile is used for the PC5 interface-based communication.

In another optional embodiment, alternatively, the mobility management network element may only send, to the terminal, the QoS rule used for the PC5 interface-based communication. For example, in a non-coverage scenario, the mobility management network element may only send, to the terminal, the QoS rule used for the PC5 interface-based communication, and does not send, to the base station, the QoS profile used for the PC5 interface-based communication. In another optional embodiment, alternatively, the mobility management network element may only send, to the base station, the QoS profile used for the PC5 interface-based communication. For example, when the terminal changes from an idle state to a connected state, the mobility management network element may only send, to the base station, the QoS profile used for the PC5 interface-based communication, and does not send, to the terminal, the QoS rule used for the PC5 interface-based communication.

Further optionally, the parameter configuration network element may further send fourth indication information to the mobility management network element. The mobility management network element may further receive the fourth indication information from the parameter configuration network element, where the fourth indication information may be used to indicate that the QoS rule and/or the QoS profile are/is used for the PC5 interface-based communication.

Optionally, when it is determined that a PDU session is used for the PC5 interface-based communication and there is no data transmission on the PDU session, the base station may skip initiating an AN release procedure. For details, refer to the related descriptions of the embodiment shown in FIG. 2*a*, and the details are not described herein again.

506. The terminal obtains scheduled-resource information according to the QoS rule, and sends a V2X message on a resource corresponding to the scheduled-resource information.

Optionally, when the parameter configuration network element is not a PCF but is, for example, a V2X control function, the V2X control function may further send a third request message to the PCF, where the third request message is used to request, from the PCF, the information used for the PC5 interface-based communication. Further, the PCF may send, to the V2X control function based on the third request message, the PCC rule for the PC5 interface-based communication, and the V2X control function may receive the PCC rule. Alternatively, the PCF may send, to the V2X control function based on the third request message, the QoS rule and/or the QoS profile that are/is used for the PC5 interface-based communication, and the V2X control function may receive the QoS rule and/or the QoS profile that are/is used for the PC5 interface-based communication and that are/is sent by the PCF. Further optionally, the third request message may further include fifth indication information, where the fifth indication information may be used to indicate that the third request message is used to request the information used for the PC5 interface-based communication; or the fifth indication information may be used to indicate that the third request message is used to request the information used for the V2X communication, and the information used for the V2X communication includes the information for the PC5 interface-based communication. Further optionally, the PCF may further send sixth indication information to the V2X control function, where the sixth indication information may be used to indicate that the PCC rule is used for the PC5 interface-based communication, or may be used to indicate that the QoS rule and/or the QoS profile are/is used for the PC5 interface-based communication.

Optionally, the scheduled-resource information may be requested by the terminal from the base station, or may be determined by the terminal according to the QoS rule. For details, refer to the related descriptions of the embodiment shown in FIG. 2*a*, and the details are not described herein again. Further, the terminal may send the V2X message on the resource corresponding to the scheduled-resource information.

It should be understood that, in another optional embodiment, the mobility management network element may alternatively send, to the terminal, a stored QoS rule (stored in the mobility management network element or a UDM) used for the PC5 interface-based communication, and the terminal may receive the QoS rule; and/or the mobility management network element may alternatively send, to the base station, a stored QoS profile used for the PC5 interface-based communication, and the base station may receive the QoS profile. In another optional embodiment, if the base station does not receive the QoS profile sent by the mobilty management network element, the base station may alternatively determine the scheduled-resource information for the terminal based on a QoS profile stored in the base station. If the terminal does not receive the QoS rule from the mobilty management network element, the terminal may alternatively determine the scheduled-resource information based on a QoS rule stored in the terminal.

In this embodiment of the present invention, the terminal may send, to the mobility management network element, the first request message used to request the information used for the PC5 interface-based communication of the terminal, so that the mobility management network element can send, to the parameter configuration network element based on the first request message, the second request message used to request the information used for the PC5 interface-based communication of the terminal, and the parameter configuration network element can send, to the mobility management network element based on the second request message, the QoS rule and the QoS profile that are used for the PC5 interface-based communication. Further, the mobility management network element can send, to the terminal, the QoS rule used for the PC5 interface-based communication, and send the QoS profile to the base station. In this way, QoS information used for the PC5 interface-based communication can be obtained from a network side, so that the terminal and the base station determine, based on the QoS rule and/or the QoS profile, the scheduled-resource information for the terminal to perform a V2X service. This helps improve reliability and flexibility of the obtained QoS information, and prevents the QoS information from being modified without authorization, thereby reducing improper resource allocation.

Figure 6:
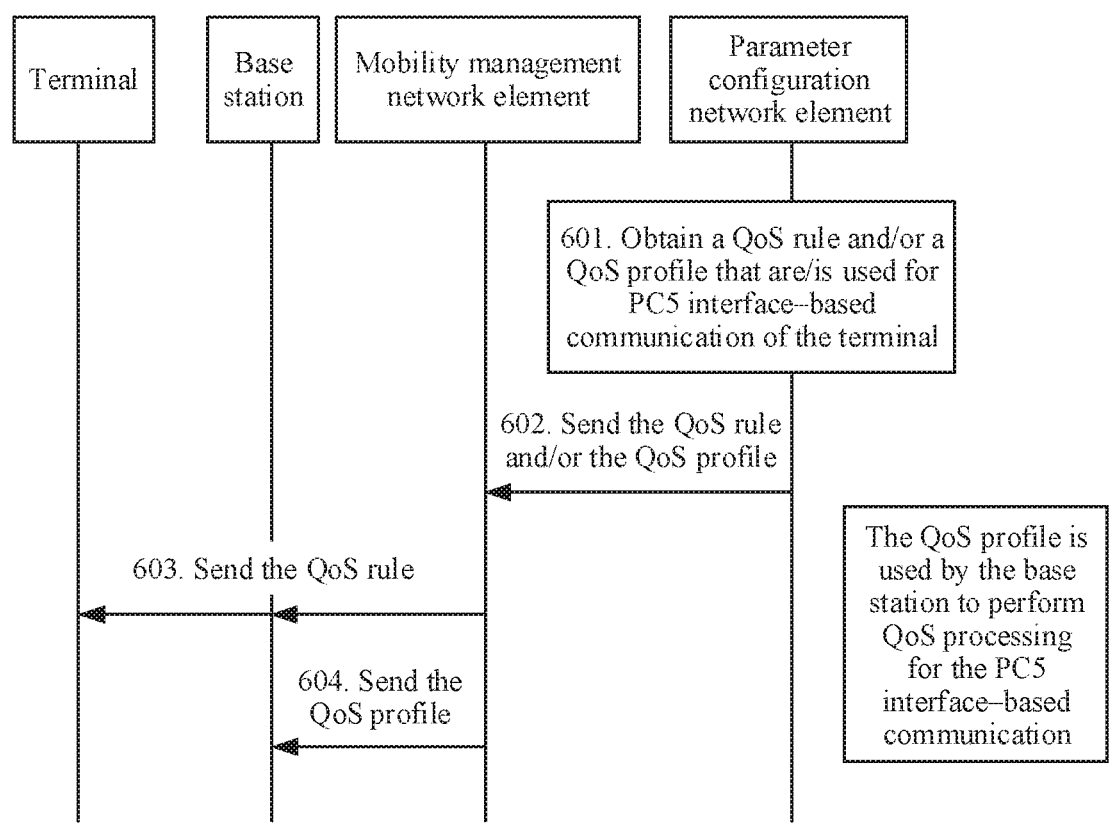
FIG. 6 is a schematic interaction diagram of still another communication method according to an embodiment of the present invention.

FIG. 6 is a schematic interaction diagram of a communication method according to an embodiment of the present invention. As shown in FIG. 6, the method may include the following steps.

601. A parameter configuration network element obtains a QoS rule and/or a QoS profile that are/is used for PC5 interface-based communication of a terminal.

Optionally, the QoS rule and/or the QoS profile may be obtained by the parameter configuration network element in a preset time interval, or may be obtained by the parameter configuration network element by receiving an indication from an application server, or may be obtained when it is detected that a PCC rule is updated, or may be obtained in another manner. This is not limited in this application. The QoS rule and/or the QoS profile may be determined by the parameter configuration network element according to an obtained PCC rule (where the PCC rule is obtained from stored information, is received from another network element such as a PCF, or is obtained in another manner); or may be received by the parameter configuration network element from the another network element such as the PCF. Details are not described herein.

602. The parameter configuration network element sends the QoS rule and/or the QoS profile to a mobility management network element.

Optionally, the parameter configuration network element sends first indication information to the mobility management network element, where the first indication information is used to indicate that the QoS rule and/or the QoS profile are/is used for the PC5 interface-based communication.

Specifically, after obtaining the QoS rule and/or the QoS profile, the parameter configuration network element may send the QoS rule and/or the QoS profile to the mobility management network element, and may send indication information, namely, the first indication information, to the mobility management network element, to indicate that the QoS rule and/or the QoS profile are/is used for the PC5 interface-based communication. For example, one message may carry both the first indication information and the QoS rule and/or the QoS profile.

603. The mobility management network element sends the QoS rule to the terminal.

Optionally, the mobility management network element sends second indication information to the terminal, where the second indication information is used to indicate that the QoS rule is used for the PC5 interface-based communication.

604. The mobility management network element sends the QoS profile to a base station.

Optionally, the mobility management network element sends third indication information to the base station, where the third indication information is used to indicate that the QoS profile is used for the PC5 interface-based communication.

Specifically, for steps 603 and 604, refer to the related descriptions of steps 504 and 505 in the embodiment shown in FIG. 5. Details are not described herein again.

Further optionally, if the mobility management network element obtains the QoS rule used for the PC5 interface-based communication (where the mobility management network element receives the QoS rule that is used for the PC5 interface-based communication and that is sent by the parameter configuration network element, or obtains a stored QoS rule used for the PC5 interface-based communication), when sending the QoS rule to the terminal through the base station, the mobility management network element may further send one piece of indication information, namely, the second indication information, to the terminal through the base station, to indicate that the QoS rule is used for the PC5 interface-based communication. If the mobility management network element obtains the QoS profile used for the PC5 interface-based communication (where the mobility management network element receives the QoS profile that is used for the PC5 interface-based communication and that is sent by the parameter configuration network element, or obtains a stored QoS profile used for the PC5 interface-based communication), when sending the QoS profile to the base station, the mobility management network element may further send one piece of indication information, namely, the third indication information, to the base station, to indicate that the QoS profile is used for the PC5 interface-based communication. The terminal may receive the QoS rule and the second indication information. The base station may receive the QoS profile and the third indication information. Further optionally, the second indication information and the third indication information may be independent indication information, to be specific, separately indicate that corresponding information is used for the PC5 interface-based communication. Alternatively, the second indication information and the third indication information may be a same piece of indication information, to be specific, one piece of indication information may be used to indicate that the QoS rule and the QoS profile are used for the PC5 interface-based communication. This is not limited in this application.

Further, the terminal may obtain scheduled-resource information according to the QoS rule, and send a V2X message on a resource corresponding to the scheduled-resource information. Details are not described herein.

It should be understood that this embodiment may be independently implemented, or may be jointly implemented with the embodiment in FIG. 2a or FIG. 5. For example, this embodiment may be applied to update of the QoS rule and/or the QoS profile that are/is used for the PC5 interface-based communication. This is not limited in this application.

In this embodiment of the present invention, the parameter configuration network element can obtain the QoS rule and/or the QoS profile that are/is used for the PC5 interface-based communication, and send, to the mobility management network element, the QoS rule and/or the QoS profile that carry/carries the indication information used for the PC5 interface-based communication. Further, the mobility management network element can send, to the terminal, the QoS rule that carries the indication information used for the PC5 interface-based communication; and send, to the base station, the QoS profile that carries the indication information used for the PC5 interface-based communication. In this way, QoS information used for the PC5 interface-based communication can be obtained from a network side, so that the terminal and the base station determine, based on the QoS rule and/or the QoS profile, the scheduled-resource information for the terminal to perform a V2X service. This helps improve reliability and flexibility of the obtained QoS information, and prevents the QoS information from being modified without authorization, thereby reducing improper resource allocation.

Figure 7:
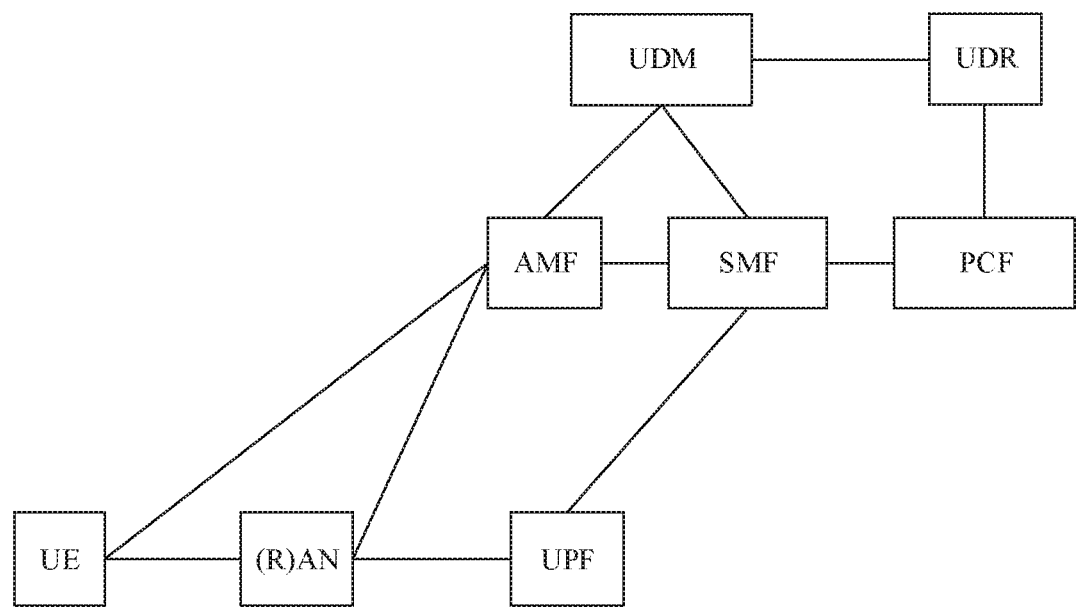
FIG. 7 is a schematic diagram of another communications system.

An example in which the terminal is UE and the parameter configuration network element is a PCF is used. FIG. 7 is a schematic diagram of another communications system. As shown in FIG. 7, the UE may communicate with an AMF and an SMF through an access network such as a radio access network (RAN for short) (which may be referred to as a (R)AN below), namely, a network in which a base station connected to the UE is located. The AMF and the SMF may communicate with the PCF. Further, the communications system may further include network elements such as a UPF, a UDM, and a UDR. The access network such as the RAN may be a network including a plurality of 5G-RAN nodes such as base stations, and is configured to implement a radio physical layer function, resource scheduling and radio resource management, radio access control, and a mobility management function. Further, the RAN may be connected to the UPF, for example, connected to the UPF via a user plane interface N3, to deliver data of the UE. The RAN may further be connected to the AMF. For example, the RAN establishes a control plane signaling connection to the AMF via a control plane interface N2, to implement a function such as radio access bearer control. For example, the AMF may be responsible for functions such as UE authentication, UE mobility management, network slice selection, and SMF selection. The SMF is mainly responsible for all control plane functions of UE session management, including UPF selection. IP address allocation, QoS management of a session, obtaining of a PCC rule (from the PCF), and the like. The PCF may configure, for the UE, information including a PCC rule, a QoS rule, a QoS profile, and the like that is used for PC5 interface-based communication. The UDR may store subscription information of the UE, and the UDM may obtain the subscription information of the UE from the UDR.

FIG. 8a-1 and FIG. 8a-2 are a schematic interaction diagram of still another communication method according to an embodiment of the present invention. As shown in FIG. 8a-1 and FIG. 8a-2, the communication method provided in this embodiment of the present invention may be based on the system architecture shown in FIG. 7. For example, a first request message is a PDU session establishment request, and a core network element is the SMF. As shown in FIG. 8a-1 and FIG. 8a-2, the method may include the following steps.

801. The UE sends, to the SMF, the PDU session establishment request carrying a PC5 indication.

When the UE needs to initiate a V2X service, and needs to obtain a corresponding QoS rule from the network, the UE may send the PDU session establishment request to the SMF, in other words, initiate a PDU session establishment procedure. The PDU session establishment request carries the PC5 indication, and the PC5 indication may be used to indicate that the PDU session establishment request is used to request information used for PC5 interface-based communication, in other words, indicate that information obtained through establishment of a PDU session is used for the PC5 interface-based communication.

Specifically, the UE initiates the establishment of the PDU session, and sends mobility management (MM for short) NAS signaling to the AMF, where the mobility management NAS signaling may include single network slice selection assistance information (S-NSSAI for short), a data network name (DNN for short), a PDU session identifier (PDU Session ID), or SM signaling, for example, the PDU session establishment request. The PDU session establishment request may carry a PDU type (PDU Type, indicating whether a type of the PDU session is IPv4 or IPv6) or a service and session continuity mode (SSC mode, indicating the service and session continuity mode of the PDU session: in mode 1, an anchor (the UPF) of an IP address remains unchanged, and service continuity is supported; in mode 2, an anchor (the UPF) of an IP address is changeable, and the network may first release a PDU session, and then indicate the UE to establish a new PDU session; in mode 3, a new network connection is established for the UE, and then an old network connection is released). Optionally, the AMF may select an appropriate SMF. For example, the AMF may select the SMF based on the S-NSSAI and the DNN. Further, the AMF may send, to the SMF, a PDU session create session management context request (Nsmf_PDUSession_CreateSMContext Request) message, where the message includes the PDU session establishment request.

802. The SMF determines that the PDU session is used for the PC5 interface-based communication.

803. The SMF sends, to the PCF, a request message used to request the information used for the PC5 interface-based communication of the UE.

The SMF may determine, based on the PC5 indication, that the information used for the PC5 interface-based communication needs to be obtained, and then may send the request message to the PCF, to request the information used for the PC5 interface-based communication of the UE or information for V2X communication. Optionally, the SMF may further send, to the PCF, the request message including indication information, such as the PC5 indication, used to indicate that the request message is used to request the information used for the PC5 interface-based communication of the UE or the information for the V2X communication. Optionally, the request message may be a session management policy establishment or modification request (session management policy establishment or modification request) message. The PC5 indication may be used to indicate that the session management policy establishment or modification request is used to request the information used for the PC5 interface-based communication. In another optional embodiment, the request message may not need to carry the indication information such as the PC5 indication, because the PCF may not need to identify that the request message is used to request the information used for the PC5 interface-based communication. For example, when there is no difference between QoS information (such as a PCC rule, a QoS rule, or a QoS profile) of a PC5 interface and QoS information of a Uu interface, there is no need to identify that the request message is used to request the information used for the PC5 interface-based communication or Uu interface-based communication. In this case, the indication information may not need to be carried. It should be understood that if there is a difference between the QoS information of the PC5 interface and the QoS information of the Uu interface, the request message needs to carry the indication information such as the PC5 indication.

804. The PCF generates a PCC rule used for the PC5 interface-based communication.

805. The PCF sends, to the SMF, the PCC rule used for the PC5 interface-based communication.

When receiving the session management policy establishment or modification request, the PCF may obtain the PCC rule used for the PC5 interface-based communication, and may return the PCC rule to the SMF. For example, a session management policy establishment or modification response (session management policy establishment or modification response) message including the PCC rule may be sent to the SMF.

Specifically, if the SMF does not have SM-related subscription information of the UE, the SMF may obtain the subscription information from the UDM. Optionally, the SM-related subscription information may include an authorized PDU type(s), an authorized SSC mode(s), a default QoS attribute (Default QoS profile), or the like. Optionally, the SMF may return a PDU session create session management context response (Nsmf_PDUSession_CreateSMContext Response) message to the AMF. Further optionally, the SMF may further initiate a third-party authentication and authorization procedure for the PDU session, so that the SMF determines, based on an authentication and authorization result, whether to continue to perform the PDU session establishment procedure for the PDU session of the UE. Further optionally, the SMF may further select the PCF, and initiate PDU-CAN session establishment to the PCF, to obtain PCC rules of the PDU session. For example, the SMF may select an approximate UPF for the PDU session based on a UE location, UPF load, a UPF capacity, the DNN, the PDU type, the SSC mode of the PDU session, or UE subscription, and allocate an IP address to the PDU session. Further, if an event subscribed by the PCF occurs, the SMF notifies the PCF of the event. If the PCC rule of the UE is updated, the PCF sends an updated PCC rule to the SMF.

Optionally, the SMF may initiate an N4 session establishment procedure to the UPF for the PDU session, in other words, establish an N4 tunnel. An N4 session establishment/modification procedure (N4 Session Establishment/modification procedure) is performed between the SMF and the UPF, to configure a packet detection rule (packet detection), a reporting rule, core network tunnel information (CN tunnel info) on the UPF. Alternatively, because the information used for the PC5 interface-based communication is obtained, the SMF may not establish the N4 tunnel for the PDU session, to reduce system signaling overheads. Further optionally, the SMF may further skip triggering establishment of an N3 tunnel for the PDU session. In other words, the SMF may not establish a backhaul tunnel for the PDU session.

806. The SMF sends, to the UE according to the PCC rule, a QoS rule used for the PC5 interface-based communication.

807. The SMF sends, to the base station according to the PCC rule, a QoS profile used for the PC5 interface-based communication.

Specifically, after receiving the PCC rule, the SMF may obtain, according to the PCC rule, the QoS rule and the QoS profile that are used for the PC5 interface-based communication. Further, the SMF may send, to the base station ((R)AN), an N2 interface session management information (N2 SM info) message including the QoS profile used for the PC5 interface-based communication, and send, to the UE, a PDU session establishment accept message including the QoS rule used for the PC5 interface-based communication.

808. The base station determines that the QoS profile is used for the PC5 interface-based communication, and marks the QoS profile as being used for the PC5 interface-based communication.

Specifically, the SMF sends parameter information of the PDU session to the AMF. The parameter information includes N1 SM information (the PDU session establishment accept message) sent to the UE, where the PDU session establishment accept message may include one or more of (an authorized QoS rule, the SSC mode, the S-NSSAI, an allocated IPv4 address, and a session-AMBR); and the N2 SM information sent to the RAN, where the N2 SM information may include one or more of (the PDU session ID, the QoS profile, the CN tunnel Info, the S-NSSAI, and the session-AMBR). Further, the AMF may send, to the RAN, the N1 SM information and the N2 SM information that are received from the SMF. Optionally, the RAN exchanges RRC signaling with the UE, to establish a necessary air-interface resource for the PDU session. In addition, the RAN may send the N1 SM information to the UE. Optionally, the RAN may further reply an N2 PDU Session Response message to the AMF, where the N2 PDU Session Response message may include the PDU session ID and N2 SM information (one or more of the PDU session ID, (R)AN tunnel info, or a list of accepted/rejected QoS profile(s)). Further optionally, the AMF may send, to the SMF, the N2 SM information received from the RAN, the SMF may send the (R)AN tunnel info in the N2 SM information to the UPF, and the UPF may return a response message to the SMF. Optionally, if the N3 tunnel is not established for the PDU session, the N2 SM information sent by the SMF to the RAN does not include the CN tunnel info, and the N2 SM information sent by the RAN to the SMF does not include the (R)AN tunnel info. Further, the SMF may return a response message to the AMF. If the PDU session fails to be established, the SMF notifies the AMF that the establishment of the PDU session fails.

Optionally, if the RAN identifies that the received QoS profile is used for the PC5 interface-based communication, the RAN may mark the QoS profile as being used for the PC5 interface-based communication. For example, the RAN stores the QoS profile in context information of the UE, and indicates that the QoS profile is used for the PC5 interface-based communication. Optionally, the RAN skips establishment of an air-interface DRB and/or a backhaul tunnel (for example, an N3 tunnel) for the PDU session, to reduce the system signaling overheads. Alternatively, the RAN may still establish a DRB, to reuse a Uu interface scheduling mechanism. Details are not described herein.

Optionally, even though there is no data transmission on all PDU sessions of the UE, the UE, the base station, and the SMF skip initiating AN release. Further optionally, if a timer such as an inactivity timer is set, and there is no data transmission on all the PDU sessions, the AN release is not initiated even though the inactivity timer expires.

Optionally, when it is determined that the PDU session is used for the PC5 interface-based communication and there is no data transmission on the PDU session, the SMF, the base station, and/or the UE may skip initiating a PDU session deactivation procedure. Details are not described herein.

Further, the RAN may further reply the N2 PDU Session Response message such as N2 PDU Session Request Ack to the AMF, where the N2 PDU Session Response message may include the PDU session ID, the N2 interface session management information N2 SM information, or the like. The N2 SM information may include the one or more of the PDU session identifier (PDU Session ID), base station tunnel information (the (R)AN tunnel info), or the list of accepted/rejected QoS profile(s) (List of accepted/rejected QoS profile) Further, the AMF may send, to the SMF, the N2 SM information received from the RAN, for example, may send, to the SMF, an PDU session update session management context request (Nsmf_PDUSession_UpdateSMContext Request) message that includes the N2 SM information. The SMF may send the (R)AN tunnel info in the N2 SM information to the UPF, and the UPF may return the response message to the SMF. For example, the SMF may send the (R)AN tunnel info to the UPF through a PDU session modification procedure. Further, the SMF may return the response message to the AMF. For example, the response message may be an Nsmf_PDUSession_UpdateSMContext Response message. It should be understood that if the N3 tunnel is not established, the N2 SM information at least does not need to include the base station tunnel information ((R)AN tunnel info). Optionally, the PDU session identifier may not need to be included.

It should be understood that, when the first request message is a PDU session modification request message, the procedure of obtaining, through the PDU session modification procedure, the information used for the PC5 interface-based communication is similar to the PDU session establishment procedure, and details are not described herein again.

In this embodiment of the present invention, the UE may send, to the SMF, the PDU session establishment request used to request the information used for the PC5 interface-based communication of the UE, so that the SMF can send, to the PCF based on the PDU session establishment request, the request message used to request the information used for the PC5 interface-based communication of the UE, and the PCF can send, to the SMF based on the request message, the PCC rule used for the PC5 interface-based communication. Further, after obtaining the QoS rule and the QoS profile according to the PCC rule, the SMF can send, to the UE, the QoS rule used for the PC5 interface-based communication, and send the QoS profile to the base station. In this way, QoS information used for the PC5 interface-based communication can be obtained from a network side, so that the UE and the base station determine, based on the QoS rule and/or the QoS profile, scheduled-resource information for the UE to perform a V2X service. This helps improve reliability and flexibility of the obtained QoS information, and prevents the QoS information from being modified without authorization.

Figures 1, 8B:
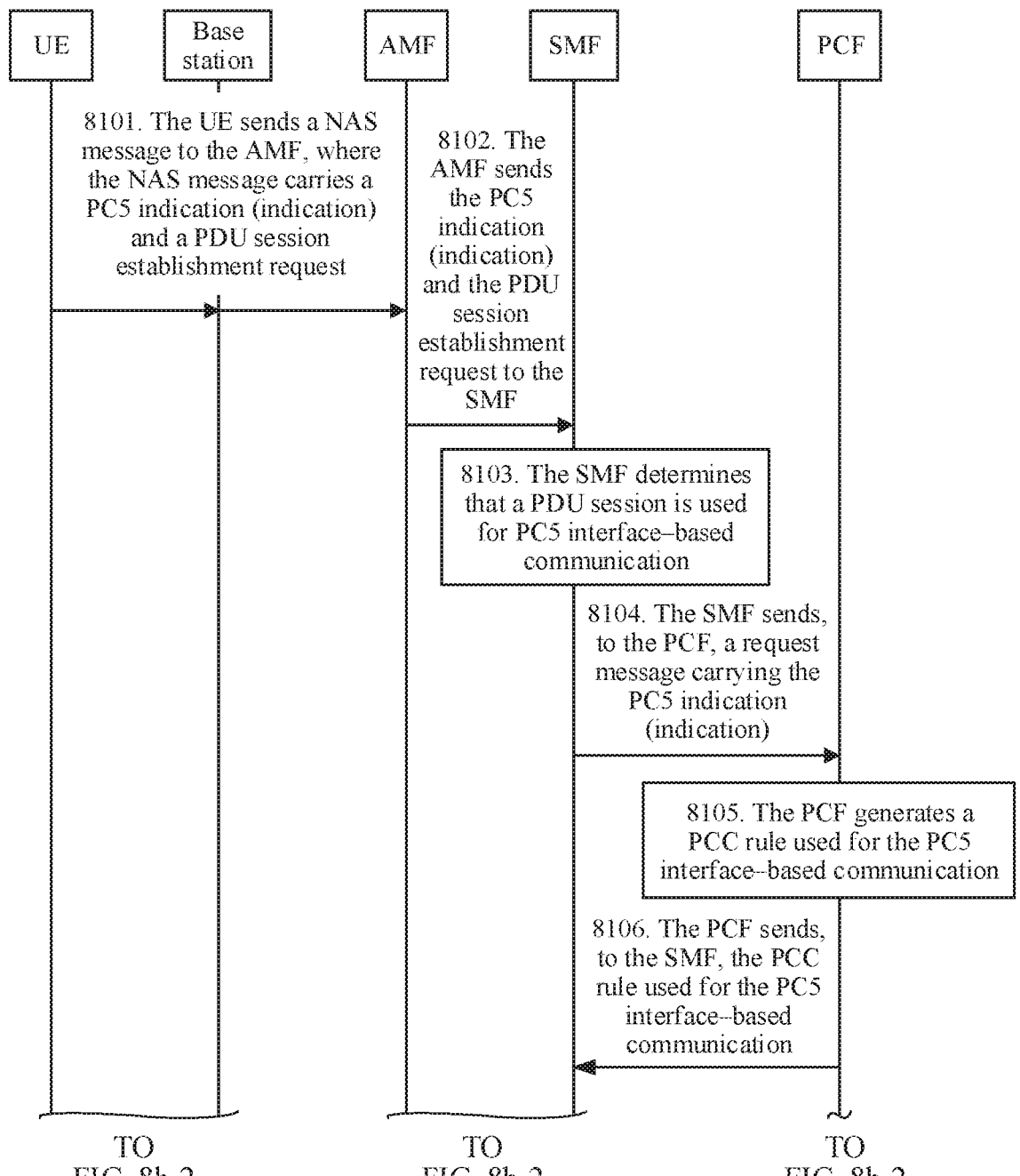
Figures 2, 8B:
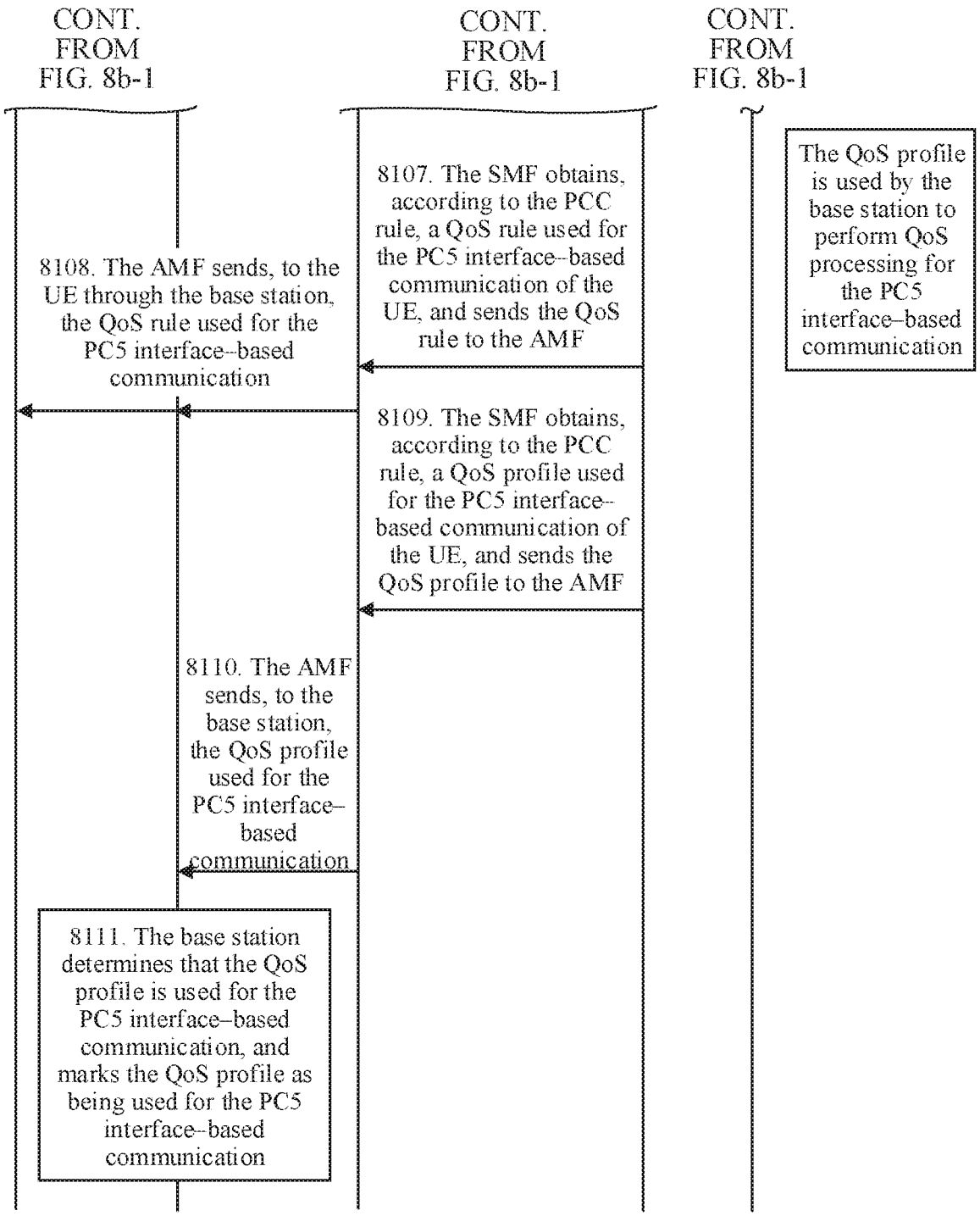

FIG. 8b-1 and FIG. 8b-2 are a schematic interaction diagram of still another communication method according to an embodiment of the present invention. As shown in FIG. 8b-1 and FIG. 8b-2, the communication method provided in this embodiment of the present invention may be based on the system architecture shown in FIG. 7. For example, a first request message is a PDU session establishment request, and a core network element is the SMF. As shown in FIG. 8b-1 and FIG. 8b-2, the method may include the following steps.

8101. The UE sends a NAS message to the AMF, where the NAS message carries a PC5 indication and the PDU session establishment request.

When the UE needs to initiate a V2X service, and needs to obtain a corresponding QoS rule from the network, the UE may send, to the AMF, the NAS message carrying the PDU session establishment request and indication information such as the PC5 indication. The PC5 indication may be used to indicate that the PDU session establishment request is used to request information used for PC5 interface-based communication, in other words, indicate that information obtained through establishment of a PDU session is used for the PC5 interface-based communication.

Specifically, the UE initiates the establishment of the PDU session, and sends MM NAS signaling to the AMF. The MM NAS signaling may include S-NSSAI, a DNN, a PDU session ID, and SM signaling, for example, the PDU session establishment request. The PDU session establishment request may carry a PDU type (PDU Type, indicating whether a type of the PDU session is IPv4 or IPv6), or a service and session continuity mode. Optionally, the AMF may select an appropriate SMF. Details are not described herein.

8102. The AMF sends, to the SMF, the PC5 indication and the PDU session establishment request.

8103. The SMF determines that the PDU session is used for the PC5 interface-based communication.

8104. The SMF sends, to the PCF, a request message carrying the PC5 indication.

8105. The PCF generates a PCC rule used for the PC5 interface-based communication.

8106. The PCF sends, to the SMF, the PCC rule used for the PC5 interface-based communication.

8107. The SMF obtains, according to the PCC rule, a QoS rule used for the PC5 interface-based communication of the UE, and sends the QoS rule to the AMF.

8108. The AMF sends, to the UE through the base station, the QoS rule used for the PC5 interface-based communication.

8109. The SMF obtains, according to the PCC rule, a QoS profile used for the PC5 interface-based communication of the UE, and sends the QoS profile to the AMF.

8110. The AMF sends, to the base station, the QoS profile used for the PC5 interface-based communication.

8111. The base station determines that the QoS profile is used for the PC5 interface-based communication, and marks the QoS profile as being used for the PC5 interface-based communication.

Specifically, for descriptions of steps 8103 to 8106 and 8111, refer to the related descriptions of the embodiment shown in FIG. 8a-1 and FIG. 8a-2. Details are not described herein again.

In this embodiment of the present invention, the UE may send, to the SMF through the AMF, the PDU session establishment request used to request the information used for the PC5 interface-based communication of the UE, so that the SMF can send, to the PCF based on the PDU session establishment request, the request message used to request the information used for the PC5 interface-based communication of the UE, and the PCF can send, to the SMF based on the request message, the PCC rule used for the PC5 interface-based communication. Further, after obtaining the QoS rule and the QoS profile according to the PCC rule, the SMF can send, to the UE through the AMF, the QoS rule used for the PC5 interface-based communication, and send the QoS profile to the base station through the AMF. In this way, the UE and the base station determine, based on the QoS rule and/or the QoS profile, scheduled-resource information for the UE to perform a V2X service. This helps improve reliability and flexibility of the obtained QoS information, and prevents the QoS information from being modified without authorization.

Figure 9:
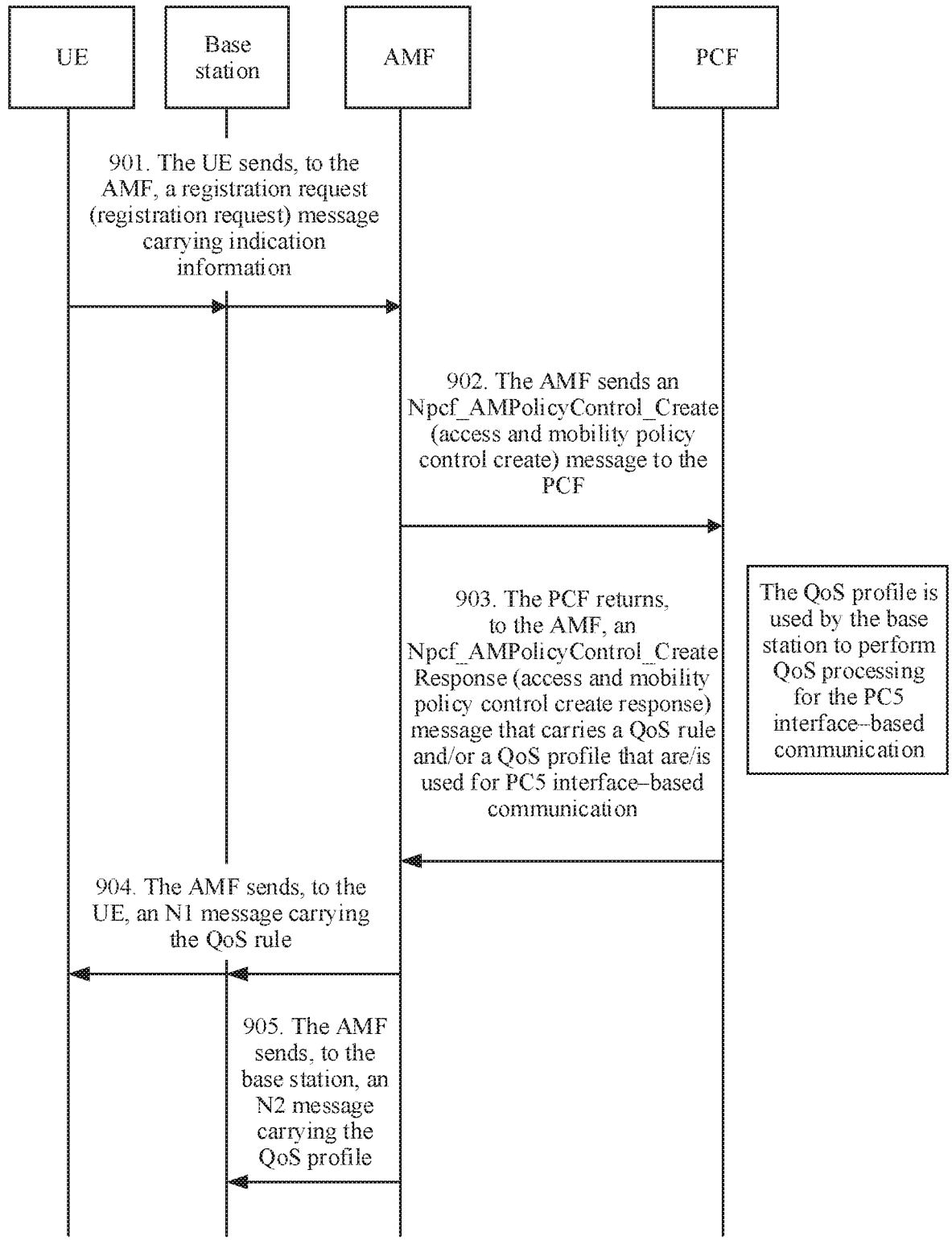
FIG. 9 is a schematic interaction diagram of still another communication method according to an embodiment of the present invention.

FIG. 9 is a schematic interaction diagram of a communication method according to an embodiment of the present invention. As shown in FIG. 9, the communication method provided in this embodiment of the present invention may be based on the system architecture shown in FIG. 7. For example, a first request message is a registration request message. As shown in FIG. 9, the method may include the following steps.

901. The UE sends, to the AMF, the registration request message carrying indication information.

The UE may send the registration request message to the AMF through the RAN, to request information for V2X communication. Optionally, the registration request message may carry the indication information such as a PC5 indication or a V2X communication indication such as a V2X capability indication (where the following uses an example in which the indication information is the V2X capability indication for description), to indicate that the registration request message is used to request the information used for the V2X communication, in other words, to indicate that the registration procedure is used to register UE of a V2X type with a network, in other words, to indicate that the registration procedure is used to register UE of a V2X type with a network and request the information used for the V2X communication. The information for the V2X communication may include information used for PC5 interface-based communication. In other words, the information that is for the V2X communication and that is requested by using the registration request message needs to include the information used for the PC5 interface-based communication.

902. The AMF sends, to the PCF, an access and mobility policy control create (Npcf_AMPolicyControl_Create) message.

After receiving the registration request message, the AMF may send, to the PCF based on the indication information such as the V2X capability indication, a request message, such as the Npcf_AMPolicyControl_Create message, that is used to request the information for the PC5 interface-based communication. Optionally, the Npcf_AMPolicyControl_Create message may carry the indication information such as the V2X capability indication.

903. The PCF returns, to the AMF, an access and mobility policy control create response (Npcf_AMPolicyControl_Create Response) message that carries a QoS rule and/or a QoS profile that are/is used for the PC5 interface-based communication.

After receiving the Npcf_AMPolicyControl_Create message, the PCF may obtain a PCC rule used for the PC5 interface-based communication. For example, the PCF may obtain subscription information of the UE (for example, obtain the subscription information of the UE from the UDR), and further obtain the PCC rule based on the subscription information. Further, the PCF may generate, according to the PCC rule, the QoS rule and/or the QoS profile that are/is used for the PC5 interface-based communication, and returns the QoS rule and/or the QoS profile to the AMF. For example, the Npcf_AMPolicyControl_Create Response message including the QoS rule and/or the QoS profile may be sent to the AMF. Optionally, the Npcf_AMPolicyControl_Create Response message may include the information for the V2X communication of the UE, and the information for the V2X communication includes the QoS rule and/or the QoS profile that are/is used for the PC5 interface-based communication.

904. The AMF sends, to the UE, an N1 message carrying the QoS rule.

905. The AMF sends, to the base station, an N2 message carrying the QoS profile.

Optionally, the AMF may alternatively only send, to the UE, the N message that carries the QoS rule used for the PC5 interface-based communication. For example, the QoS rule is used only in a scenario without network coverage, and the AMF may only send the N1 message to the UE, but does not send, to the base station, the N2 message that carries the QoS profile used for the PC5 interface-based communication. Optionally, the AMF may alternatively only send the N2 message to the base station. For example, when the UE changes from an idle state to a connected state, the AMF may only send the N2 message to the base station, but does not send the N1 message to the UE, because the UE previously stores the QoS rule.

Optionally, the N1 message may include a registration accept message, a UE configuration update command message, or the like. The N2 message may be an initial context setup request message or a UE context modification request.

The AMF may receive the information for the V2X communication that is sent by the PCF and that includes the QoS rule and/or the QoS profile that are/is used for the PC5 interface-based communication; and may send, to the base station, the QoS profile used for the PC5 interface-based communication, and send, to the UE, the QoS rule used for the PC5 interface-based communication. For example, the configuration update command message including the QoS rule used for the PC5 interface-based communication may be sent to the UE, and the initial context setup message including the QoS profile used for the PC5 interface-based communication may be sent to the base station. The base station may receive and store the QoS profile used for the PC5 interface-based communication, for example, store the QoS profile in context information of the UE. The UE may receive and store the QoS rule used for the PC5 interface-based communication.

Alternatively, in another optional embodiment, the AMF may alternatively obtain, in another manner, the QoS rule and/or the QoS profile that are/is used for the PC5 interface-based communication. For example, after the AMF receives the registration request message sent by the UE, the AMF may send a subscription data management getting (service) (Nudm_SDM_Get) message to the UDM to request the subscription information of the UE. The UDM returns the subscription information to the AMF. In this way, the AMF obtains the subscription information of the UE. The subscription information of the UE may be obtained by the UDM from the UDR. Optionally, the subscription information of the UE includes the QoS rule and/or the QoS profile. Alternatively, the subscription information of the UE includes the PCC rule, and then the AMF obtains, based on the subscription information, the QoS rule and/or the QoS profile that are/is used for the PC5 interface-based communication.

Further, the UE may obtain scheduled-resource information according to the QoS rule, and send a V2X message on a resource corresponding to the scheduled-resource information. Details are not described herein.

In this embodiment of the present invention, the UE may send, to the AMF, the registration request message used to request the information used for the PC5 interface-based communication of the UE, so that the AMF can send, to the PCF based on the registration request message, the Npcf_AMPolicyControl_Create message used to request the information used for the PC5 interface-based communication of the UE, the PCF can send, to the AMF based on the Npcf_AMPolicyControl_Create message, the information for the V2X communication that includes the QoS rule and the QoS profile that are used for the PC5 interface-based communication, and further, the AMF can send, to the UE, the QoS rule used for the PC5 interface-based communication, and send the QoS profile to the base station. In this way, QoS information used for the PC5 interface-based communication can be obtained from a network side, so that the UE and the base station determine, based on the QoS rule and/or the QoS profile, the scheduled-resource information for the UE to perform a V2X service. This helps improve reliability and flexibility of the obtained QoS information, and prevents the QoS information from being modified without authorization, thereby reducing improper resource allocation.

The foregoing method embodiments are descriptions of examples of the communication method in this application. Each embodiment is described with emphasis. For a part that is not described in detail in an embodiment, refer to related descriptions of other embodiments.

Figure 10:
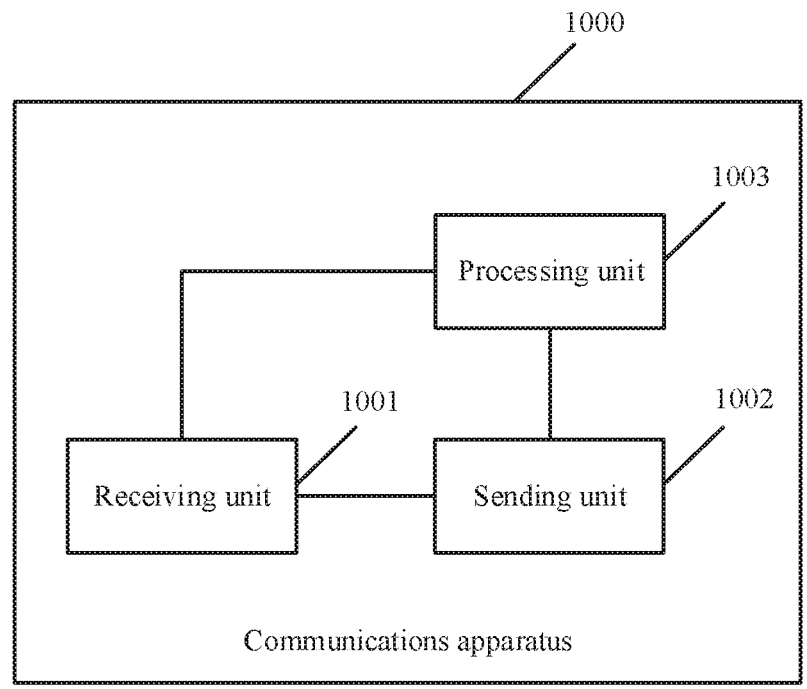
FIG. 10 is a schematic structural diagram of a communications apparatus according to an embodiment of the present invention.

FIG. 10 is a possible schematic structural diagram of a communications apparatus in the foregoing embodiments. The communications apparatus may be a core network element such as a mobility management network element or a session management function network element, may be disposed in a core network element, or may be at least one processing element or chip. Referring to FIG. 10, the communications apparatus 1000 may include a receiving unit 1001 and a sending unit 1002. These units may perform corresponding functions of the mobility management network element such as the AMF or the session management function network element such as the SMF in the foregoing method examples. For example, the receiving unit 1001 is configured to receive a first request message from a terminal, where the first request message is used to request information used for PC5 interface-based communication of the terminal; and the sending unit 1002 is configured to send, to the terminal based on the first request message, a quality of service QoS rule used for the PC5 interface-based communication.

Optionally, the sending unit 1002 is further configured to send, to a base station based on the first request message, a QoS profile used for the PC5 interface-based communication.

Optionally, the apparatus further includes a processing unit 1003.

The sending unit 1002 is further configured to send a second request message to a parameter configuration network element based on the first request message, where the second request message is used to request the information used for the PC5 interface-based communication.

The receiving unit 1001 is further configured to receive, from the parameter configuration network element, a policy and charging control PCC rule used for the PC5 interface-based communication.

The processing unit 1003 is configured to obtain the QoS rule and/or a QoS profile according to the PCC rule.

Optionally, the sending unit 1002 is further configured to send a second request message to a parameter configuration network element based on the first request message, where the second request message is used to request the information used for the PC5 interface-based communication.

The receiving unit 1001 is further configured to receive, from the parameter configuration network element, the QoS rule and/or the QoS profile that are/is used for the PC5 interface-based communication.

Optionally, the first request message includes first indication information. The first indication information is used to indicate that the first request message is used to request the information used for the PC5 interface-based communication.

Optionally, the sending unit 1002 is further configured to send second indication information to the base station, where the second indication information is used to indicate that the QoS profile is used for the PC5 interface-based communication.

Optionally, the first request message is a protocol data unit PDU session establishment message or a PDU session modification message; and the apparatus further includes the processing unit 1003, where the processing unit 1003 is configured to skip triggering establishment of an N3 tunnel and an N4 tunnel for a PDU session.

It should be understood that, in this embodiment of the present invention, division into units is an example, and is merely logical function division. During actual implementation, another division manner may be used. Functional units in this embodiment of the present invention may be integrated into one processing unit, or each of the units may exist alone physically, or two or more units may be integrated into one unit. The integrated unit may be implemented in a form of hardware, or may be implemented in a form of a software functional unit.

Optionally, the communications apparatus may implement, through the foregoing units, some or all of the steps performed by the core network element such as the mobility management network element or the session management function network element in the communication methods in the embodiments shown in FIG. 2a to FIG. 9. It should be understood that this embodiment of the present invention is an apparatus embodiment corresponding to the method embodiment, and the descriptions of the method embodiment are also applicable to this embodiment of the present invention.

Figure 11:
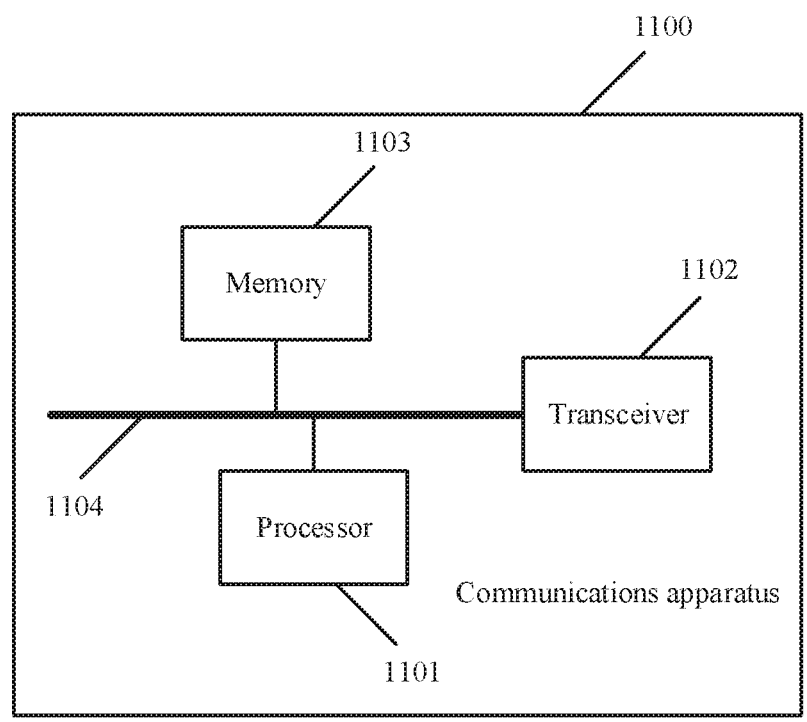
FIG. 11 is a schematic structural diagram of another communications apparatus according to an embodiment of the present invention.

Referring to FIG. 11, in another embodiment, a communications apparatus 1100 may include a processor 1101 and a transceiver 1102. Optionally, the communications apparatus may further include a memory 1103. The processor 1101, the transceiver 1102, and the memory 1103 may be connected to each other. For example, the processor 1101, the transceiver 1102, and the memory 1103 may be connected to each other via a bus 1104. The bus 1104 may be a peripheral component interconnect (PCI for short) bus, an extended industry standard architecture (EISA for short) bus, or the like. The bus may be classified into an address bus, a data bus, a control bus, and the like. For ease of representation, only one thick line is used to represent the bus in FIG. 11, but this does not mean that there is only one bus or only one type of bus.

The processor 1101 may be a processor or a controller, for example, may be a central processing unit (CPU for short), a general purpose processor, a digital signal processor (DSP for short), an application-specific integrated circuit (ASIC for short), a field programmable gate array (FPGA for short) or another programmable logic device, a transistor logic device, a hardware component, or any combination thereof. The processor 1101 may implement or execute various examples of logical blocks, modules, and circuits described with reference to content disclosed in this application. Alternatively, the processor may be a combination of processors implementing a computing function, for example, a combination of one or more microprocessors, or a combination of the DSP and a microprocessor. The transceiver 1102 may include an independent receiver and an independent transmitter, or may be obtained by integrating the receiver and the transmitter.

The processor 1101 is configured to control and manage an action of the communications apparatus such as a core network element. For example, the processor 1101 is configured to support the communications apparatus in performing the step 304 in FIG. 3, the step 403 in FIG. 4, the step 802 in FIG. 8a-1, and/or another step used for the technology described in this specification. The transceiver 1102 may perform a communication function, and is configured to support the communications apparatus in communicating with another network entity such as a parameter configuration network element, a base station, or a terminal, for example, communicating with the functional unit or the network entity shown in FIG. 2a to FIG. 9, to perform, for example, the steps 201 and 202 in FIG. 2a, the steps 301 to 303, 305, and 306 in FIG. 3, the steps 402, 404, and 405 in FIG. 4, the steps 501 to 505 in FIG. 5, the steps 602 to 604 in FIG. 6, the steps 801, 803, and 805 to 807 in FIG. 8a-1 and FIG. 8a-2, the steps 901 to 905 in FIG. 9, and/or another step used for the technology described in this specification. Specifically, the processor 1101 is configured to determine to send or receive a signal, and is a controller of the communication function. To be specific, when sending or receiving a signal, the processor 1101 controls or drives the transceiver 1102 to perform related sending or receiving. The transceiver 1102 may implement a specific communication operation under control of the processor 1101, and is an executor of the communication function.

Further, the memory 1103 may be configured to store at least one of program code and data of the communications apparatus. When the processor 1101 works under driving of software such as a CPU, a DSP, or a microcontroller, the processor 1101 may read the program code stored in the memory 1103 and work under driving of the program code.

Method or algorithm steps described in combination with the content disclosed in the present invention may be implemented by hardware, or may be implemented by a processor by executing a software instruction. The software instruction may include a corresponding software module. The software module may be stored in a random access memory (RAM for short), a flash memory, a read-only memory (ROM for short), an erasable programmable read-only memory (EPROM for short), an electrically erasable programmable read-only memory (electrically EPROM, EEPROM for short), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may alternatively be a component of the processor. The processor and the storage medium may be located in the ASIC. In addition, the ASIC may be located in the communications apparatus. Certainly, the processor and the storage medium may alternatively exist in the communications apparatus as discrete components.

Figure 12:
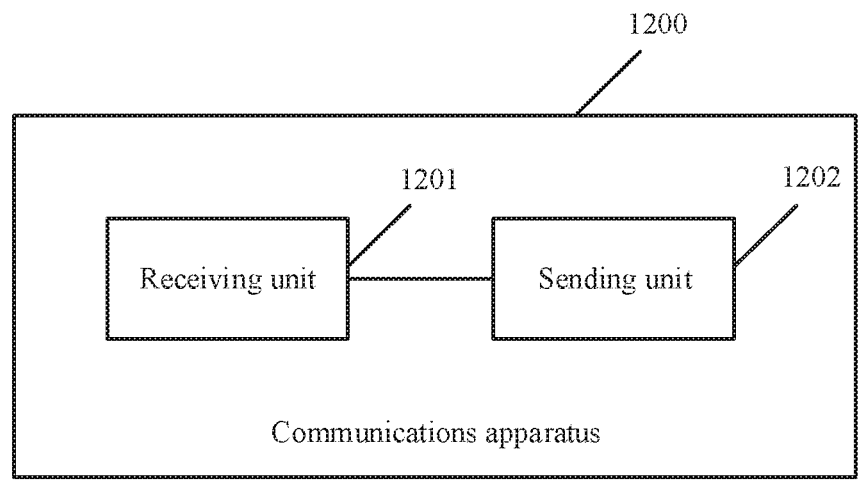
FIG. 12 is a schematic structural diagram of still another communications apparatus according to an embodiment of the present invention.

FIG. 12 is a possible schematic structural diagram of a communications apparatus in the foregoing embodiments. The communications apparatus may be a parameter configuration network element, may be disposed in a parameter configuration network element, or may be at least one processing element or chip. Referring to FIG. 12, the communications apparatus 1200 may include a receiving unit 1201 and a sending unit 1202. These units may perform corresponding functions of the parameter configuration network element such as the PCF in the foregoing method examples. For example, the receiving unit 1201 is configured to receive a request message from a core network element, where the request message is used to request information used for PC5 interface-based communication of a terminal; and the sending unit 1202 is configured to send, to the core network element based on the request message, a policy and charging control PCC rule used for the PC5 interface-based communication; or the sending unit 1202 is configured to send, to the core network element based on the request message, a quality of service QoS rule and/or a QoS profile that are/is used for the PC5 interface-based communication.

Optionally, the communications apparatus is a policy and charging function PCF network element, and the request message is an access and mobility policy control create (Npcf_AMPolicyControl_Create) message. Alternatively, the communications apparatus is a vehicle-to-everything V2X parameter configuration network element, and the request message is a V2X parameter request message.

Optionally, the request message includes indication information. The indication information is used to indicate that the request message is used to request the information used for the PC5 interface-based communication.

It should be understood that, in this embodiment of the present invention, division into units is an example, and is merely logical function division. During actual implementation, another division manner may be used. Functional units in this embodiment of the present invention may be integrated into one processing unit, or each of the units may exist alone physically, or two or more units may be integrated into one unit. The integrated unit may be implemented in a form of hardware, or may be implemented in a form of a software functional unit.

Optionally, the communications apparatus may implement, through the foregoing units, some or all of the steps performed by the parameter configuration network element in the communication methods in the embodiments shown in FIG. 2a to FIG. 9. It should be understood that this embodiment of the present invention is an apparatus embodiment corresponding to the method embodiment, and the descriptions of the method embodiment are also applicable to this embodiment of the present invention.

Figure 13:
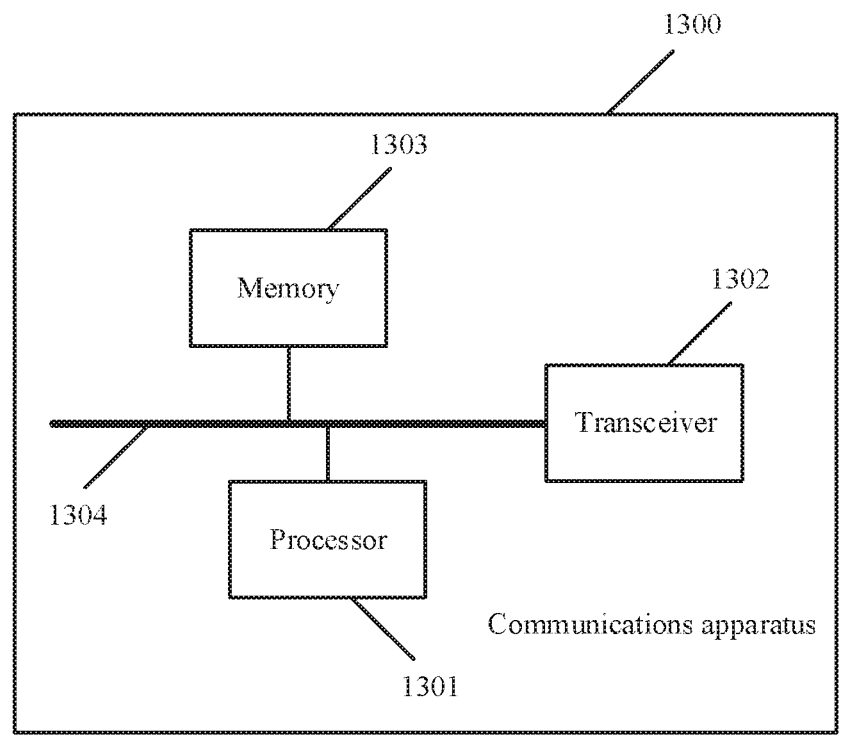
FIG. 13 is a schematic structural diagram of still another communications apparatus according to an embodiment of the present invention.

Referring to FIG. 13, in another embodiment, a communications apparatus 1300 such as a parameter configuration network element may include a processor 1301 and a transceiver 1302. Optionally, the communications apparatus may further include a memory 1303. The processor 1301, the transceiver 1302, and the memory 1303 may be connected to each other. For example, the processor 1301, the transceiver 1302, and the memory 1303 may be connected to each other via a bus 1304. The bus 1304 may be a PCI bus, an EISA bus, or the like. The bus may be classified into an address bus, a data bus, a control bus, and the like. For ease of representation, only one thick line is used to represent the bus in FIG. 13, but this does not mean that there is only one bus or only one type of bus.

The processor 1301 may be a processor or a controller, for example, may be a CPU, a general purpose processor, a DSP, an ASIC, an FPGA or another programmable logic device, a transistor logic device, a hardware component, or any combination thereof. The processor 1301 may implement or execute various examples of logical blocks, modules, and circuits described with reference to content disclosed in this application. Alternatively, the processor may be a combination of processors implementing a computing function, for example, a combination of one or more microprocessors, or a combination of the DSP and a microprocessor. The transceiver 1302 may include an independent receiver and an independent transmitter, or may be obtained by integrating the receiver and the transmitter.

The processor 1301 is configured to control and manage an action of the communications apparatus. For example, the processor 1301 is configured to support the communications apparatus in performing the step 401 in FIG. 4, the step 601 in FIG. 6, the step 804 in FIG. 8a-1, and/or another step used for the technology described in this specification. The transceiver 1302 may perform a communication function, and is configured to support the communications apparatus in communicating with another network entity such as a core network element, for example, communicating with the functional unit or the network entity shown in FIG. 2a to FIG. 9, to perform, for example, the steps 302 and 303 in FIG. 3, the step 402 in FIG. 4, the steps 502 and 503 in FIG. 5, the step 602 in FIG. 6, the steps 803 and 805 in FIG. 8a-1, the steps 902 and 903 in FIG. 9, and/or another step used for the technology described in this specification. Specifically, the processor 1301 is configured to determine to send or receive a signal, and is a controller of the communication function. To be specific, when sending or receiving a signal, the processor 1301 controls or drives the transceiver 1302 to perform related sending or receiving. The transceiver 1302 may implement a specific communication operation under control of the processor 1301, and is an executor of the communication function.

Further, the memory 1303 may be configured to store at least one of program code and data of the communications apparatus. When the processor 1301 works under driving of software such as a CPU, a DSP, or a microcontroller, the processor 1301 may read the program code stored in the memory 1303 and work under driving of the program code.

Method or algorithm steps described in combination with the content disclosed in the present invention may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may alternatively be a component of the processor. The processor and the storage medium may be located in the ASIC. In addition, the ASIC may be located in the communications apparatus. Certainly, the processor and the storage medium may alternatively exist in the communications apparatus as discrete components.

Figure 14:
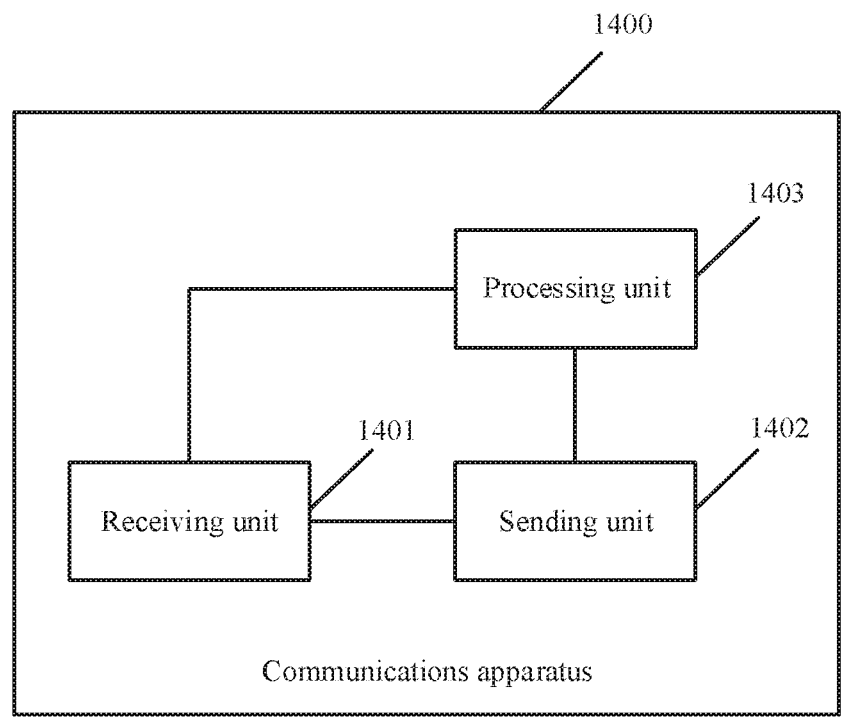
FIG. 14 is a schematic structural diagram of still another communications apparatus according to an embodiment of the present invention.

FIG. 14 is still another possible schematic structural diagram of a communications apparatus in the foregoing embodiments. The communications apparatus may be a base station, may be disposed in a base station, or may be at least one processing element or chip. Referring to FIG. 14, the communications apparatus 1400 may include a receiving unit 1401 and a sending unit 1402. These units may perform corresponding functions of the base station in the foregoing method examples. For example, the receiving unit 1401 is configured to receive a request message from a terminal, where the request message is used to request information used for PC5 interface-based communication of the terminal; the sending unit 1402 is configured to send the request message to a core network element; the receiving unit 1401 is further configured to receive, from the core network element, a quality of service QoS rule used for the PC5 interface-based communication; and the sending unit 1402 is further configured to send the QoS rule to the terminal.

Optionally, the receiving unit 1401 is further configured to receive, from the core network element, a QoS profile used for the PC5 interface-based communication.

Optionally, the receiving unit 1401 is further configured to receive indication information from the core network element, where the indication information is used to indicate that the QoS profile is used for the PC5 interface-based communication.

Optionally, the request message is a protocol data unit PDU session establishment message or a PDU session modification message; and the apparatus further includes a processing unit 1403, where the processing unit 1403 is configured to skip triggering establishment of an air-interface data radio bearer (DRB) and/or an N3 tunnel for a PDU session.

Optionally, the receiving unit 1401 is further configured to receive a scheduling request from the terminal, where the scheduling request includes an identifier of the QoS rule; and the sending unit 1402 is further configured to send scheduled-resource information to the terminal based on the identifier of the QoS rule.

It should be understood that, in this embodiment of the present invention, division into units is an example, and is merely logical function division. During actual implementation, another division manner may be used. Functional units in this embodiment of the present invention may be integrated into one processing unit, or each of the units may exist alone physically, or two or more units may be integrated into one unit. The integrated unit may be implemented in a form of hardware, or may be implemented in a form of a software functional unit.

Optionally, the communications apparatus may implement, through the foregoing units, some or all of the steps performed by the base station in the communication methods in the embodiments shown in FIG. 2a to FIG. 9. It should be understood that this embodiment of the present invention is an apparatus embodiment corresponding to the method embodiment, and the descriptions of the method embodiment are also applicable to this embodiment of the present invention.

Figure 15:
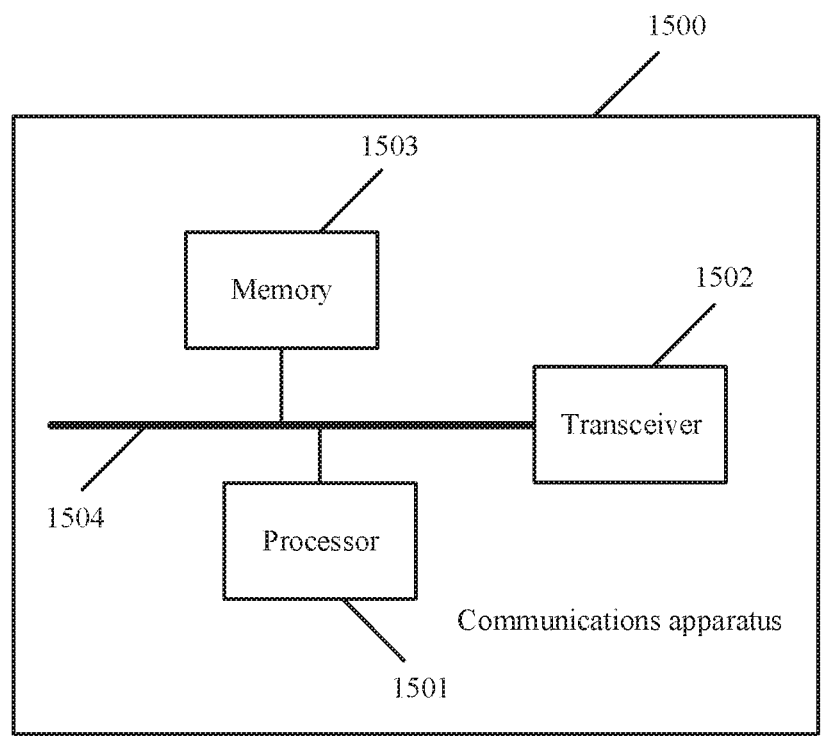
FIG. 15 is a schematic structural diagram of still another communications apparatus according to an embodiment of the present invention.

Referring to FIG. 15, in another embodiment, the communications apparatus 1500 such as a base station may include a processor 1501 and a transceiver 1502. Optionally, the communications apparatus may further include a memory 1503. The processor 1501, the transceiver 1502, and the memory 1503 may be connected to each other. For example, the processor 1501, the transceiver 1502, and the memory 1503 may be connected to each other via a bus 1504. The bus 1504 may be a PCI bus, an EISA bus, or the like. The bus may be classified into an address bus, a data bus, a control bus, and the like. For ease of representation, only one thick line is used to represent the bus in FIG. 15, but this does not mean that there is only one bus or only one type of bus.

The processor 1501 may be a processor or a controller, for example, may be a CPU, a general purpose processor, a DSP, an ASIC, an FPGA or another programmable logic device, a transistor logic device, a hardware component, or any combination thereof. The processor 1501 may implement or execute various examples of logical blocks, modules, and circuits described with reference to content disclosed in this application. Alternatively, the processor may be a combination of processors implementing a computing function, for example, a combination of one or more microprocessors, or a combination of the DSP and a microprocessor. The transceiver 1502 may include an independent receiver and an independent transmitter, or may be obtained by integrating the receiver and the transmitter.

The processor 1501 is configured to control and manage an action of the communications apparatus. For example, the processor 1501 is configured to support the communications apparatus in performing the process 808 in FIG. 8a-2 and/or another process used for the technology described in this specification. The transceiver 1502 may perform a communication function, and is configured to support the communications apparatus in communicating with another network entity such as a terminal or core network element, for example, communicating with the functional unit or the network entity shown in FIG. 2a to FIG. 9, to perform, for example, the steps 2101 to 2103 in FIG. 2b, the step 306 in FIG. 3, the step 405 in FIG. 4, the step 505 in FIG. 5, the step 604 in FIG. 6, the step 807 in FIG. 8a-2, the step 905 in FIG. 9, and/or another step used for the technology described in this specification. Specifically, the processor 1501 is configured to determine to send or receive a signal, and is a controller of the communication function. To be specific, when sending or receiving a signal, the processor 1501 controls or drives the transceiver 1502 to perform related sending or receiving. The transceiver 1502 may implement a specific communication operation under control of the processor 1501, and is an executor of the communication function.

Further, the memory 1503 may be configured to store at least one of program code and data of the communications apparatus. When the processor 1501 works under driving of software such as a CPU, a DSP, or a microcontroller, the processor 1501 may read the program code stored in the memory 1503 and work under driving of the program code.

Method or algorithm steps described in combination with the content disclosed in the present invention may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may alternatively be a component of the processor. The processor and the storage medium may be located in the ASIC. In addition, the ASIC may be located in the communications apparatus. Certainly, the processor and the storage medium may alternatively exist in the communications apparatus as discrete components.

Figure 16:
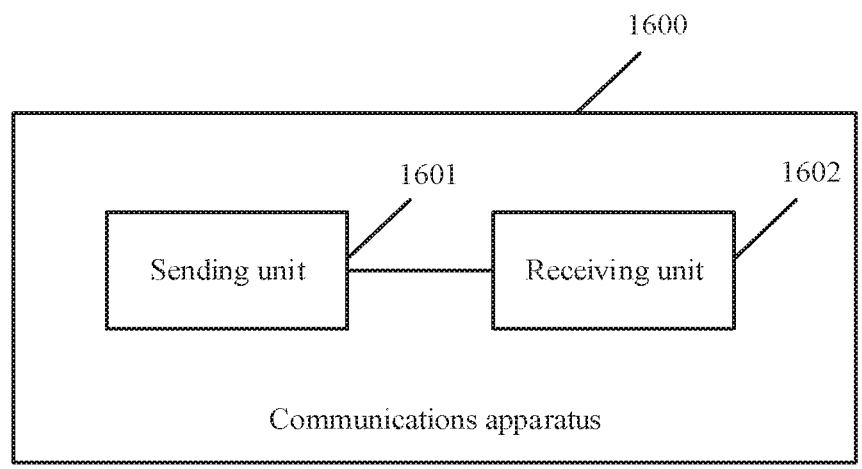
FIG. 16 is a schematic structural diagram of still another communications apparatus according to an embodiment of the present invention.

FIG. 16 is still another possible schematic structural diagram of a communications apparatus in the foregoing embodiments. The communications apparatus may be a terminal, may be disposed in a terminal, or may be at least one processing element or chip. Referring to FIG. 16, the communications apparatus 1600 may include a sending unit 1601 and a receiving unit 1602. These units may perform corresponding functions of the terminal such as the UE in the foregoing method examples. For example, the sending unit 1601 is configured to send a request message to a core network element, where the request message is used to request information used for PC5 interface-based communication of the terminal; and the receiving unit 1602 is configured to receive, from the core network element, a quality of service QoS rule used for the PC5 interface-based communication.

Optionally, the request message includes indication information. The indication information is used to indicate that the request message is used to request the information used for the PC5 interface-based communication.

Optionally, the sending unit 1601 is further configured to send a scheduling request to a base station, where the scheduling request includes an identifier of the QoS rule; and the receiving unit 1602 is further configured to: receive scheduled-resource information from the base station, and send a vehicle-to-everything V2X message on a resource corresponding to the scheduled-resource information.

It should be understood that, in this embodiment of the present invention, division into units is an example, and is merely logical function division. During actual implementation, another division manner may be used. Functional units in this embodiment of the present invention may be integrated into one processing unit, or each of the units may exist alone physically, or two or more units may be integrated into one unit. The integrated unit may be implemented in a form of hardware, or may be implemented in a form of a software functional unit.

Optionally, the communications apparatus may implement, through the foregoing units, some or all of the steps performed by the terminal in the communication methods in the embodiments shown in FIG. 2a to FIG. 9. It should be understood that this embodiment of the present invention is an apparatus embodiment corresponding to the method embodiment, and the descriptions of the method embodiment are also applicable to this embodiment of the present invention.

Figure 17:
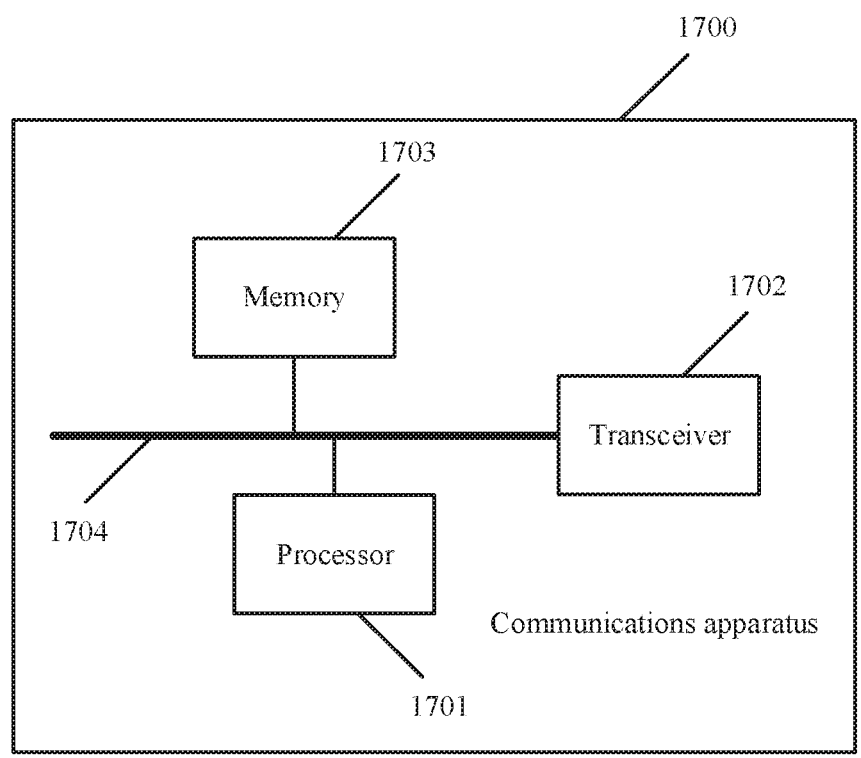
FIG. 17 is a schematic structural diagram of still another communications apparatus according to an embodiment of the present invention.

Referring to FIG. 17, in another embodiment, the communications apparatus 1700 such as a terminal may include a processor 1701 and a transceiver 1702. Optionally, the communications apparatus may further include a memory 1703. The processor 1701, the transceiver 1702, and the memory 1703 may be connected to each other. For example, the processor 1701, the transceiver 1702, and the memory 1703 may be connected to each other via a bus 1704. The bus 1704 may be a PCI bus, an EISA bus, or the like. The bus may be classified into an address bus, a data bus, a control bus, and the like. For ease of representation, only one thick line is used to represent the bus in FIG. 17, but this does not mean that there is only one bus or only one type of bus.

The processor 1701 may be a processor or a controller, for example, may be a CPU, a general purpose processor, a DSP, an ASIC, an FPGA or another programmable logic device, a transistor logic device, a hardware component, or any combination thereof. The processor 1701 may implement or execute various examples of logical blocks, modules, and circuits described with reference to content disclosed in this application. Alternatively, the processor may be a combination of processors implementing a computing function, for example, a combination of one or more microprocessors, or a combination of the DSP and a microprocessor. The transceiver 1702 may include an independent receiver and an independent transmitter, or may be obtained by integrating the receiver and the transmitter.

The processor 1701 is configured to control and manage an action of the communications apparatus. For example, the processor 1701 is configured to support the communications apparatus in performing the step 203 in FIG. 2a, the step 307 in FIG. 3, the step 506 in FIG. 5, and/or another step used for the technology described in this specification. The transceiver 1702 may perform a communication function, and is configured to support the communications apparatus in communicating with another network entity such as a base station or a core network element, for example, communicating with the functional unit or the network entity shown in FIG. 2a to FIG. 9, to perform, for example, the steps 201 and 202 in FIG. 2a, the steps 301 and 305 in FIG. 3, the step 404 in FIG. 4, the steps 501 and 504 in FIG. 5, the step 603 in FIG. 6, the steps 801 and 806 in FIG. 8a-1 and FIG. 8a-2, the steps 901 and 904 in FIG. 9, and/or another step used for the technology described in this specification. Specifically, the processor 1701 is configured to determine to send or receive a signal, and is a controller of the communication function. To be specific, when sending or receiving a signal, the processor 1701 controls or drives the transceiver 1702 to perform related sending or receiving. The transceiver 1702 may implement a specific communication operation under control of the processor 1701, and is an executor of the communication function.

Further, the memory 1703 may be configured to store at least one of program code and data of the communications apparatus. When the processor 1701 works under driving of software such as a CPU, a DSP, or a microcontroller, the processor 1701 may read the program code stored in the memory 1703 and work under driving of the program code.

Method or algorithm steps described in combination with the content disclosed in the present invention may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may alternatively be a component of the processor. The processor and the storage medium may be located in the ASIC. In addition, the ASIC may be located in the communications apparatus. Certainly, the processor and the storage medium may alternatively exist in the communications apparatus as discrete components.

This application further provides a communications system. The system includes the foregoing core network element, parameter configuration network element, base station, and/or terminal. Optionally, the system may further include another device that interacts with the foregoing network elements in the solutions provided in the embodiments of the present invention. The core network element, the parameter configuration network element, the base station, and/or the terminal may perform some or all of the steps in the communication methods in the embodiments shown in FIG. 2a to FIG. 9. For details, refer to the related descriptions of the foregoing embodiments, and the details are not described herein again.

In an implementation process, the steps in the foregoing methods can be implemented through a hardware integrated logical circuit in the processor, or by using instructions in a form of software. The steps of the methods disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should further be understood that the "first", "second", "third" and various digital numbers in this specification are merely for differentiation for ease of description, and are not intended to limit the scope of the embodiments of the present invention.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing steps do not mean execution sequences in various embodiments of this application. The execution sequences of the steps should be determined according to functions and internal logic of the steps, and should not be construed as any limitation on the implementation steps of the embodiments of the present invention.

A person of ordinary skill in the art may be aware that, in combination with various illustrative logical blocks and steps described in the embodiments disclosed in this specification may be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present invention are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to the computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid-state drive Solid State Disk (SSD)), or the like.

What is claimed is:

1. A communication method, comprising:
receiving, by a core network element, a first request message from a terminal, wherein the first request message is used to request information used for PC5 interface-based communication of the terminal;
sending, by the core network element, a second request message to a policy and charging function (PCF) network element based on the first request message, wherein the second request message is used to request the information used for the PC5 interface-based communication;
receiving, by the core network element from the PCF network element, a quality of service (QoS) rule used for the PC5 interface-based communication; and sending, by the core network element to the terminal and based on the first request message, the quality of service (QoS) rule, wherein the core network element is a mobility management network element.

2. The method according to claim 1, wherein the method further comprises:
sending, by the core network element to a base station and based on the first request message, a QoS profile used for the PC5 interface-based communication.

3. The method according to claim 2, wherein the method further comprises:
sending, by the core network element, first indication information to the base station, wherein the first indication information is used to indicate that the QoS profile is used for the PC5 interface-based communication.

4. The method according to claim 1, wherein the first request message comprises second indication information, and wherein the second indication information is used to indicate that the first request message is used to request the information used for the PC5 interface-based communication.

5. The method according to claim 1, wherein the first request message is a protocol data unit (PDU) session establishment message or a PDU session modification message, and wherein the method further comprises:
skipping triggering, by the core network element, establishment of an N3 tunnel and an N4 tunnel for a PDU session.

6. The method according to claim 2, wherein the method further comprises:
receiving, by the core network element from the PCF network element, the QoS profile.

7. A communication method, comprising:
sending, by a core network element, a first request message to a policy and charging function (PCF) network element, wherein the first request message is used to request information used for PC5 interface-based communication of a terminal, wherein the core network element is a mobility management network element; and
sending, by the PCF network element to the core network element and based on the first request message, a policy and charging control (PCC) rule used for the PC5 interface-based communication; or
sending, by the PCF network element to the core network element and based on the first request message, at least one of a quality of service (QoS) rule or a QoS profile that is used for the PC5 interface-based communication.

8. The method according to claim 7, wherein the first request message comprises indication information, and wherein the indication information is used to indicate that the first request message is used to request the information used for the PC5 interface-based communication.

9. The method according to claim 7, further comprising:
receiving, by a base station, a second request message from the terminal, wherein the second request message is used to request information used for PC5 interface-based communication of the terminal;
sending, by the base station, the second request message to the core network element; and
receiving, by the base station and from the core network element, the QoS rule, and sending the QoS rule to the terminal.

10. The method according to claim 9, wherein the method further comprises:
receiving, by the base station and from the core network element, the QoS profile.

11. The method according to claim 10, wherein the method further comprises:
receiving, by the base station, indication information from the core network element, wherein the indication information is used to indicate that the QoS profile is used for the PC5 interface-based communication.

12. The method according to claim 9, wherein the second request message is a protocol data unit (PDU) session establishment message or a PDU session modification message, and wherein the method further comprises:
skipping triggering, by the base station, establishment of at least one of an air-interface data radio bearer (DRB) or an N3 tunnel for a PDU session.

13. The method according to claim 9, wherein the method further comprises:
receiving, by the base station, a scheduling request from the terminal, wherein the scheduling request comprises an identifier of the QoS rule; and
sending, by the base station, scheduled-resource information to the terminal based on the identifier of the QoS rule.

14. The method according to claim 7, wherein the method further comprises:
receiving, by the core network element from the PCF network element, the QoS profile.

15. A communication system, comprising:
a core network element, configured to send a first request message to a policy and charging function (PCF) network element, wherein the first request message is used to request information used for PC5 interface-based communication of a terminal, wherein the core network element is a mobility management network element; and
the PCF network element, configured to:
send, to the core network element and based on the first request message, a policy and charging control (PCC) rule used for the PC5 interface-based communication; or
send, to the core network element and based on the first request message, at least one of a quality of service (QoS) rule or a QoS profile that is used for the PC5 interface-based communication.

16. The system according to claim 15, wherein the first request message comprises indication information, and wherein the indication information is used to indicate that the first request message is used to request the information used for the PC5 interface-based communication.

17. The system according to claim 15, wherein the core network element is configured to:
receive, from the PCF network element, the QoS profile.

18. The system according to claim 15, wherein the core network element is further configured to:
receive a second request message from the terminal, wherein the second request message is used to request the information used for PC5 interface-based communication of the terminal.

19. The system according to claim 18, wherein the core network element is further configured to:
send the QoS rule to the terminal based on the second request message.

20. The system according to claim 15, wherein the core network element is further configured to:
  send the QoS profile to a base station.

\* \* \* \* \*